(12) United States Patent
Moffat et al.

(10) Patent No.: US 9,773,444 B2
(45) Date of Patent: Sep. 26, 2017

(54) PROJECTOR FOR PROJECTING IMAGES

(71) Applicant: Carl Zeiss AG, Oberkochen (DE)

(72) Inventors: Bryce Anton Moffat, Jena-Cospeda (DE); Christoph Nieten, Jena (DE); Enrico Geißler, Jena (DE); Alexander Gratzke, Jena (DE); Axel Krause, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 15/405,466

(22) Filed: Jan. 13, 2017

(65) Prior Publication Data
US 2017/0206822 A1  Jul. 20, 2017

(30) Foreign Application Priority Data
Jan. 14, 2016  (DE) .......... 10 2016 100 592

(51) Int. Cl.
*H04N 5/74* (2006.01)
*G09G 3/20* (2006.01)
(Continued)

(52) U.S. Cl.
CPC ........... *G09G 3/2014* (2013.01); *G09G 3/001* (2013.01); *G09G 5/10* (2013.01);
(Continued)

(58) Field of Classification Search
CPC .. H04N 5/74; H04N 5/64; H04N 9/31; G09G 3/2014; G09G 3/001; G09G 5/10;
(Continued)

(56) References Cited

U.S. PATENT DOCUMENTS 5,231,388 A * 7/1993 Stoltz ................. G02B 26/0841
345/84
6,817,717 B2 * 11/2004 Childers ................ H04N 9/315
348/743
(Continued)

FOREIGN PATENT DOCUMENTS

DE  102008029790 A1  12/2009
DE  102008029789 A1  1/2010

OTHER PUBLICATIONS

D. Doherty, G. Hewlett, 10.4: Phased Reset Timing for Improved Digital Micromirror Device (DMD) Brightness, 1998 SID, 4 pages.
(Continued)

*Primary Examiner* — Trang U Tran
(74) *Attorney, Agent, or Firm* — Skaar Ulbrich Macari, P.A.

(57) ABSTRACT

Each modulator of an image projector includes multiple pixels arranged in rows and columns, switchable independently of each other into a first state, in which light incident on them is used to generate an image, and into a second state, in which light incident on them is not used to generate an image. At least one first pixel is assigned to each second pixel such that the imaging optical system a) strikes the second pixel with light from the respective assigned first pixel when the assigned first pixel is switched into the first state, in order to illuminate the second pixel actively, and b) does not strike the second pixel it with light from the respective assigned first pixel when the assigned first pixel is switched into the second state, in order not to illuminate the second pixel actively. A control unit that controls the modulators is also disclosed.

11 Claims, 12 Drawing Sheets

(51) Int. Cl.
*G09G 3/00* (2006.01)
*G09G 5/10* (2006.01)

(52) U.S. Cl.
CPC .............. *G09G 2320/0233* (2013.01); *G09G 2320/0238* (2013.01); *G09G 2360/16* (2013.01)

(58) Field of Classification Search
CPC ... G09G 2320/0233; G09G 2320/0238; G09G 2360/16; G09G 3/34
USPC ................ 348/758, 744; 345/84; 353/57–65
See application file for complete search history.

(56) References Cited

U.S. PATENT DOCUMENTS

| | | | | |
|---|---|---|---|---|
| 6,817,719 | B2* | 11/2004 | Rudolph | G02B 17/008 348/E5.141 |
| 7,224,335 | B2* | 5/2007 | Gibbon | G09G 3/346 345/84 |
| 7,517,095 | B2* | 4/2009 | Coates | H04N 9/3126 349/5 |
| 7,781,836 | B2* | 8/2010 | Chiba | H01L 21/84 257/347 |
| 8,125,702 | B2* | 2/2012 | Ward | G03B 33/08 359/248 |
| 2003/0142274 | A1 | 7/2003 | Gibbon et al. | |
| 2006/0087712 | A1 | 4/2006 | Harper | |
| 2007/0076172 | A1* | 4/2007 | Lerner | H04N 9/3126 353/31 |
| 2011/0175926 | A1 | 7/2011 | Geissler | |
| 2011/0175953 | A1 | 7/2011 | Geissler | |
| 2014/0204134 | A1 | 7/2014 | Goerzen | |

OTHER PUBLICATIONS

Kusakabe et al., A YC-separation-type projector: High dynamic range with double modulation, Journal of the SID 16/2, 2008, pp. 383-391, 9 pages.

* cited by examiner

PROJECTOR FOR PROJECTING IMAGES

PRIORITY

This application claims the priority benefit of German Patent Application No. 102016100592.4, filed on Jan. 14, 2016, which is hereby incorporated herein by reference in its entirety.

FIELD

The present invention relates to a projector for projecting images.

BACKGROUND

Projectors for projecting images are used to keep the unavoidable background brightness as low as possible, which leads to a better representation of black image contents (with zero brightness). However, the difficulty arises that, in the case of dark image contents, the lowest input grey shades (i.e. the grey-scale values which are adjacent to the grey-scale value=zero=black) can no longer be represented so as to be distinguishable from the remaining background brightness in the projected image. So-called temporal dithering and/or spatial dithering is often resorted to here. In the case of temporal dithering, the grey-scale value to be represented is only represented correctly averaged over several successively projected images (or single images or frames) which are in each case generated for a predetermined frame duration. This means that, for example in the case of five successive frames, the corresponding pixel is only switched on in two or three frames and is switched off in the other frames. Averaged over the five frames, the desired grey-scale value can then be reasonably well represented. In the case of spatial or local dithering, the averaging is carried out over the switching on and off of adjacent pixels in a single frame. With such dithering, on the one hand not all grey-scale values can be represented. Especially the grey-scale values which are adjacent to the grey-scale value zero cannot be represented in this way. On the other hand, the dithering generates flickering which many viewers perceive as annoying. It is furthermore possible to combine local and temporal dithering and to vary them over successive frames in order to conceal the "dither pattern"—however this also leads to flickering.

These difficulties in particular also result in a poorer image impression if several projectors are used to project a large overall image, wherein in this case the projected images are projected overlapping in the edge area in order to provide a continuous image impression. If such a low grey-scale value is to be represented in this edge area, this leads to even higher brightnesses in the case of low input brightnesses because of the brightness represented at too high a level by each of the two projectors.

SUMMARY

An object of the invention is to provide a projector for projecting images by means of which the difficulties described can be overcome as completely as possible.

The disclosure includes projector for projecting images, including a first modulator which can be struck with light from a light source and a second modulator which is arranged downstream of the first modulator, an imaging optical system which images the first modulator onto the second modulator, wherein the first modulator comprises multiple first pixels arranged in rows and columns and the second modulator comprises multiple second pixels arranged in rows and columns, wherein the first and second pixels can be switched independently of each other in each case into a first state, in which light incident on them is used to generate an image, and into a second state, in which light incident on them is not used to generate an image, in order to modulate the light for generating the images pixel-by-pixel, wherein the projector furthermore comprises a projection optical system which images light coming from the second modulator onto a projection surface in order to project the images, and a control unit, which controls the two modulators on the basis of supplied image data, wherein at least one first pixel is assigned to each second pixel such that the imaging optical system a) strikes the second pixel with light from the respective assigned first pixel when the assigned first pixel is switched into the first state, in order to illuminate the second pixel actively, and b) does not strike the second pixel with light from the respective assigned first pixel when the assigned first pixel is switched into the second state, in order not to illuminate the second pixel actively, with the result that only unavoidable residual light is incident on the second pixel.

The disclosure also includes a control unit controls the modulators such that, for at least one second pixel which according to the image data is to represent a brightness value which is greater than zero and less than or equal to a predetermined first threshold value, the assigned first pixel(s) is or are switched into the second state at least for the periods in which the second pixel is switched into the first state, with the result that no active illumination takes place and the at least one second pixel modulates the residual light.

By modulating the residual light, the background brightness is effectively itself modulated, with the result that a distinct representation of very low grey-scale values and in particular grey-scale values starting with values greater than zero is possible.

The at least one second pixel preferably modulates only the residual light for generating the image or during a frame duration of the image to be generated.

By the brightness value according to the image data here is meant in particular an input grey-scale value or control value for the modulators, which is a value from a specified value range. Thus the value range can comprise for example only integral values from 0 to 255, wherein zero is said to be the lowest brightness and therefore black and 255 is said to be the greatest brightness. In the case of a coloured or multicoloured representation, this applies for each colour of the colour image or partial colour image to be generated.

In particular the control unit can actuate the second pixel modulating the residual light on the basis of an increased brightness value which is greater than the brightness value according to the image data. The second pixel modulating the residual light can therefore be referred to as a boosted pixel. Through the increase in the brightness value to be represented, the fact that the background brightness is relatively low is taken into account. A good representation of small grey-scale values is thus possible.

The control unit can actuate the second pixel modulating the residual light such that the increased brightness value or actuation value corresponds to at least 10 times the brightness value according to the image data with an assumed subdivision of the range from minimum to maximum brightness into 256 increments. The factor can also be greater than 10. In particular it is preferably in the range from 10 to 50, 15 to 45, 20 to 40, 25 to 45 or 28 to 38. Preferred values for the factor are 18, 25, 36 and 46. In particular the value of the factor can be selected depending on the contrast of the projector.

In the case of a contrast of 500:1, a factor of 18 can for example be selected. This factor is preferably used for the brightness values from 1 to 14.

In the case of a contrast of 1000:1, a factor of 25 can for example be selected. This factor is preferably used for the brightness values from 1 to 10.

In the case of a contrast of 2000:1, a factor of 36 can for example be selected. This factor is preferably used for the brightness values from 1 to 7.

In the case of a contrast of 4000:1, a factor of 46 can for example be selected. This factor is preferably used for the brightness values from 1 to 5 or from 1 to 6.

A larger factor is thus preferably selected with higher contrast.

This does not need to be a fixed factor for all grey-scale values which can be boosted (brightness values which are greater than zero and less than or equal to the predetermined first threshold value). For each grey-scale value which can be boosted, an individual factor can be specified.

The control unit can control the two modulators by means of pulse-width modulated control data. Very accurate control is thus possible. In particular the control of the two modulators can be synchronized effectively.

The control unit can determine as the at least one second pixel such a second pixel the brightness value of which, prespecified by the image data, is greater than zero and less than or equal to the first threshold value.

The control unit can furthermore determine the at least one second pixel, which modulates the residual light, by means of the following steps:
a) at least one second pixel is selected, the brightness value of which, prespecified by the image data, is greater than zero and less than or equal to the first threshold value, and
b) a selected second pixel is determined as a second pixel modulating the residual light when (preferably only when) all k neighbouring pixels (preferably in one direction, that is first direct neighbouring pixel, second neighbouring pixel which is the direct neighbour of the first direct neighbouring pixel, etc.) are selected in step a). Here k is a natural number greater than or equal to 1.

The control unit can determine the at least one second pixel, which modulates the residual light, by means of the following steps:
a) at least one second pixel is selected, the brightness value of which, prespecified by the image data, is greater than zero and less than or equal to the first threshold value, and
b) a selected second pixel is determined as a second pixel modulating the residual light when (preferably only when) all the assigned first pixels are actuated on the basis of the image data in each case according to a brightness value which is less than a predetermined second threshold value, wherein the second threshold value is selected such that the period(s) for which the assigned first pixels are to be switched into the first state do(es) not overlap with the period(s) for which the second pixel modulating the residual light is to be switched into the first state, in order to modulate the residual light.

Temporal separation of the illumination of boosted pixels and non-boosted pixels is thus achieved, which can advantageously be used at the boundary between a pixel which can be boosted and a non-boosted pixel reliably not to illuminate the boosted pixel which is at the edge (with none of the first pixels assigned to it) and sufficiently to illuminate the non-boosted pixel which is at the edge, although at least one illuminating pixel of the non-boosted pixel also illuminates the boosted pixel (but only at times when the boosted pixel is switched into the second state).

Step b) can preferably be carried out only for second pixels which can be boosted (=pixels selected in step a)), the k-th neighbouring pixel of which (in each case preferably in one direction, that is first direct neighbouring pixel, second neighbouring pixel which is the direct neighbour of the first direct neighbouring pixel, etc.) cannot be boosted (according to step a)). The first neighbouring pixels can surround the viewed second pixel which can be boosted in the form of a ring. The second neighbouring pixels can surround both the viewed second pixel which can be boosted and the first neighbouring pixels in the form of a ring. This applies in the same way to third, fourth and further neighbouring pixels. Here k is a natural number greater than or equal to 1. If all 1 to k neighbouring pixels of a second pixel which can be boosted can be boosted, the second pixel can be boosted (=selected second pixel). With the choice of k, the second pixel furthest away from the second pixel which can be boosted can in particular be determined, during active illumination of which light is incident on the second pixel which can be boosted, (in particular to such an extent or in such a proportion) that it would interfere with the residual light modulation by the second pixel which can be boosted. If a first main illuminating pixel and in addition (in one direction) n neighbouring pixels are assigned to each second pixel, wherein n is a natural number greater than or equal to 1, k is preferably set equal to n.

For actuation of the first pixels, the brightness value which is the highest of all the second pixels to which the first pixel is assigned can be selected on the basis of the image data.

With the projector, the images can preferably be projected in each case for a predetermined frame duration. In particular the first pixel(s) assigned to the at least one second pixel can be switched into the second state for the entire frame duration.

For the projector, precisely one first pixel can be assigned to each second pixel. However, it is also possible that a first pixel as well as at least one further first pixel which is directly adjacent to this first pixel are assigned to each second pixel. Furthermore, a first pixel as well as at least the further first pixels which are directly adjacent to this first pixel can be assigned to each second pixel. Not only the directly adjacent further first pixels, but also the respective further neighbours can be assigned. In other words, a first pixel as well as further first pixels which are spaced from this first pixel by no more than n pixels are assigned to each second pixel. n is a natural number greater than or equal to 1. The assigned first pixels are in particular characterized by the fact that the light coming from them is at least partially imaged onto the second pixel to which the first pixel is assigned by means of the imaging optical system.

Furthermore, the control unit in the case of the projector can, for second pixels which according to the image data are to represent a brightness value which is greater than the first threshold value, take into account the residual brightness in such a way that the second pixel is actuated on the basis of a reduced brightness value which is lower than the brightness value according to the image data. When generating the image, the second pixels are however preferably at least at times switched into the first state at the same time as at least one assigned first pixel. The residual brightness which is also modulated by means of the second pixel can thus also be taken into account, with the result that more accurate grey-scale values can be represented.

This is in particular advantageous for brightness values which although greater than the first threshold value are however less than or equal to 20% or 30% of the maximum brightness value.

The modulators are preferably reflective modulators. In particular the modulators are designed as tilting mirror matrices.

Where reference is made here to grey-scale values or brightness values, this is to be understood as the grey-scale value of the monochromatic colour in the case of a monochromatic representation. In the case of multicoloured representations, the grey-scale values are to be understood as the brightness values of the corresponding colours represented.

The projector can be configured for a multicoloured image representation. For this, for example, multicoloured illumination can be provided, which directs different primary colours onto the first modulator one after the other. The primary colours can be the colours red, green and blue. The temporal change of the primary colours is carried out so quickly that the partial colour images generated one after the other (e.g. in the colours red, green and blue) are indistinguishable for a viewer and the viewer thus only perceives a multicoloured image. In order to generate the temporally successive colours, a so-called colour wheel can be arranged between the light source (which for example emits white light) of the projector and the first modulator, which introduces different colour filters one after the other into the beam path between the light source and the first modulator. Any other type of time-sequential colour generation is however also possible.

Furthermore, multicoloured illumination of the first modulator is also possible if for example three second modulators are provided which are then illuminated with the individual colours (e.g. red, green and blue). For this, colour beamsplitter cubes can for example be used. The three second modulators then generate the partial colour images which are projected by means of the projection optical system in an overlapping manner onto the projection surface in order to generate the desired multicoloured image. Of course more or less than three second modulators can also be provided.

The disclosure further includes a projector for projecting images, in which the control unit controls the modulators such that, for at least one second pixel which according to the image data is to represent a brightness value which is greater than zero and less than or equal to a predetermined first threshold value, the at least one second pixel is switched into the second state and the assigned first pixel(s) is or are switched into the first state only during the period(s) in which the second pixel is switched into the second state, with the result that modulated residual light then emanates from the at least one second pixel, which contributes to the generation of an image.

In the case of this projector, the unavoidable residual light is also modulated in order to represent low grey-scale values. The modulation of the residual light is however carried out via the first modulator. The second modulator is only used to provide the unavoidable residual light which is then modulated for image projection. The unavoidable residual light is thus in turn utilized in a positive manner for the representation of low brightness values.

For the generation of the modulated residual light, the control unit in the case of the projector can actuate the assigned first pixel(s) on the basis of an increased brightness value which is greater than the brightness value according to the image data. The assigned first pixel(s) is (are) thus boosted. This projector according to the invention in which the assigned first pixel(s) is (are) boosted can be further developed in an identical or similar manner to the projector according to the invention described at the beginning.

Of course both projectors can also be combined such that second pixels and first pixels are successively boosted in the manner described.

A projector for projecting images can include, for second pixels, a control unit that takes the residual brightness into account in such a way that the second pixel is actuated on the basis of a reduced brightness value which is lower than the brightness value according to the image data. In particular the second pixels which are actuated by means of the reduced brightness value are at least at times switched into the first state at the same time as at least one assigned first pixel. It is thus principally modulated in the case of active illumination of the second pixel. In addition, however, the modulation of the unavoidable residual light is taken into account for the desired brightness, which results in more accurate brightness values. This is in particular advantageous for low brightness values which are for example less than or equal to 30% of the maximum brightness value or less than or equal to 20% of the maximum brightness value.

The imaging optical system can in particular embodiments be configured as a 1:1-imaging optical system. It can however also be designed as a magnifying or reducing imaging optical system.

A 1:1 assignment between first and second pixels is preferably provided by the imaging optical system. Due to the actual implementation of the modulators and/or of the imaging optical system, in the case of active illumination, light from adjacent first pixels can also be imaged onto the second pixel assigned according to the 1:1 assignment.

It is however also possible, e.g. by means of the dimensions of the modulators used and/or the arrangement thereof, to ensure that the light from multiple first pixels is always imaged onto a second pixel.

Any of the projectors disclosed herein can comprise the light source as a component of the projector. The projectors can in addition comprise further means known to a person skilled in the art which are necessary to operate the projector.

A projection system is furthermore provided in which at least two projectors are operated such that their projected images partially overlap in order to generate a larger overall image. Such a projection system can, for example, be used for dome projection (e.g. in planetaria) or for flight simulators or other simulators (e.g. for cars, trucks, motorcycles, etc.).

The disclosure further includes a method for projecting images in which a projector is operated such that the control unit controls the modulators such that, for at least one second pixel which according to the image data is to represent a brightness value which is greater than zero and less than or equal to a predetermined first threshold value, the assigned first pixel(s) is or are switched into the second state at least for the periods in which the second pixel is switched into the first state, with the result that no active illumination takes place and the second pixel modulates the residual light.

The at least one second pixel preferably modulates only the residual light for generating the image or during a frame duration of the image to be generated.

Moreover, the disclosure includes a method for projecting an image using a projector in which the control unit controls the modulators such that, for at least one second pixel which according to the image data is to represent a brightness value which is greater than zero and less than or equal to a predetermined first threshold value, the at least one second pixel is switched into the second state and the assigned first pixel(s) is or are switched into the first state only during the period(s) in which the second pixel is switched into the second state, with the result that modulated residual light then emanates from the at least one second pixel, which contributes to the generation of an image.

The disclosure also includes a method for projecting images in which a projector is operated such that, for second pixels, the control unit takes the residual brightness into account in such a way that the second pixel is actuated on the basis of a reduced brightness value which is lower than the brightness value according to the image data.

The second pixel which is actuated by means of a reduced brightness value is preferably at least at times switched into the first state at the same time as at least one assigned first pixel. The second pixel is consequently actively illuminated and modulates the illumination light, wherein the unavoidable residual light is simultaneously taken into account.

The methods according to the disclosure can be further developed in a corresponding manner to the devices and projectors of the disclosure.

It is understood that the features named above and those yet to be explained below can be used not only in the stated combinations but also in other combinations or alone, without departing from the scope of the present invention.

BRIEF DESCRIPTION OF THE DRAWINGS

FIG. 8 is a representation according to FIG. 5, wherein the γ curve of the projector with dual modulation is additionally drawn in.

FIG. 12 is a schematic representation to illustrate the determination of whether a second pixel can be boosted or not.

FIG. 13 is a schematic representation to illustrate the determination of the pattern data M on the basis of the given image data BD.

Figure 1:
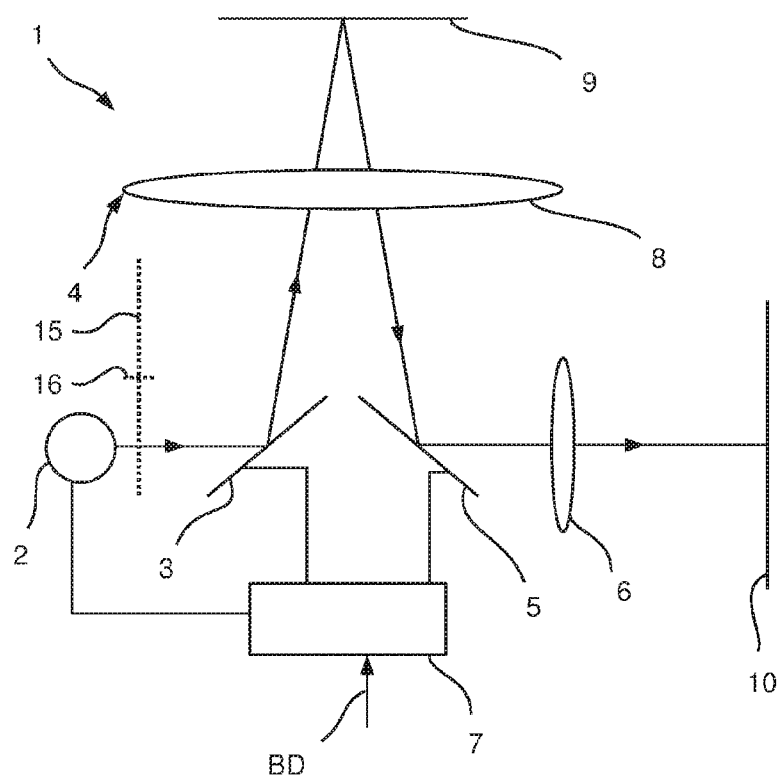
FIG. 1 is a schematic representation of an embodiment of the projector according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the projector 1 according to the invention comprises, for projecting images for in each case a predetermined frame duration, a light source 2, an illumination modulator 3, an imaging optical system 4, an image modulator 5, a projection optical system 6 and a control unit 7.

The two modulators 3, 5 are each designed as a tilting mirror matrix (also referred to as DMD below) which comprises several tilting mirrors arranged in rows and columns, wherein the tilting mirrors can independently of each other be brought into a first and a second tilting position.

Figure 2:
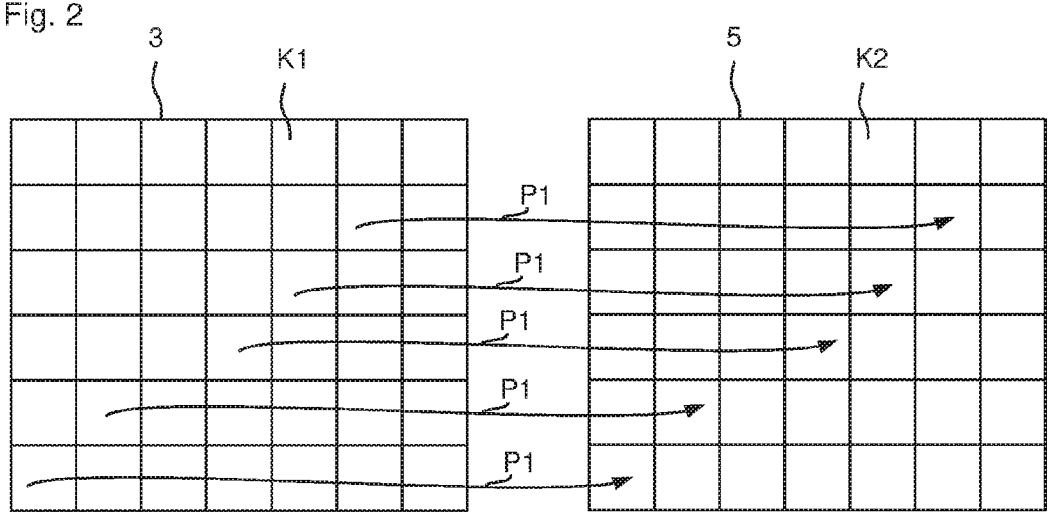
FIG. 2 is a schematic representation to illustrate the assignment between the first pixels of the first modulator and the second pixels of the second modulator.

In the embodiment example described, the illumination modulator 3 comprises several tilting mirrors K1 (also referred to as illuminating pixels below) and the image modulator 5 comprises several tilting mirrors K2 (also referred to as image pixels below). FIG. 2 represents, in each case schematically, 6×7 tilting mirrors K1, K2. The tilting mirrors K1 and K2 each have identical dimensions, wherein the small number of tilting mirrors K1 and K2 is assumed merely for simplification of the representation. The modulators 3, 5 can of course contain a great many more tilting mirrors K1, K2 than illustrated.

The imaging optical system 4 is designed as a 1:1-imaging optical system with a lens 8 and a mirror 9 and images each tilting mirror K1 of the illumination modulator 3 onto precisely one tilting mirror K2 of the image modulator 5, as indicated by the arrows P1. Precisely one image pixel K2 of the image modulator 5 is consequently assigned to each illuminating pixel K1 of the illumination modulator 3 on the basis of the imaging by means of the imaging optical system 4. In other words, precisely one illuminating pixel K1 is assigned to each image pixel K2.

The two modulators 3 and 5 are controlled by the control unit 7 on the basis of supplied image data BD for each of the images to be projected one after the other such that the illumination modulator 3 which is charged with the light (e.g. white light) from the light source 2 is a two-dimensionally modulated light source for the image modulator 5 by means of which the image to be projected is generated or modulated, which image is then projected by means of the projection optical system 6 onto a projection surface 10. In order to provide the two-dimensionally modulated light source, the projector 1 is designed such that the light which is reflected by the tilting mirrors K1, in the first tilting position, of the illumination modulator 3 is imaged onto the assigned tilting mirror K2 of the image modulator 5. The light reflected by the tilting mirrors K1, in the second tilting position, of the illumination modulator 3 is absorbed by a beam dump (not shown) and is consequently not imaged onto the image modulator 5. The image generation or modulation then takes place by means of the tilting position of the image pixels (=tilting mirror K2 of the image modulator 5) since only the light reflected by the image pixels K2 in the first tilting position is projected via the projection optical system 6 onto the projection surface 10. The light reflected by the image pixels K2 in the second tilting position is not projected onto the projection surface 10 but is absorbed e.g. in a beam dump (not shown). The image to be projected, which is projected by means of the projection optical system 6, is thus modulated or generated by the tilting position of the image pixels K2.

Figure 3:
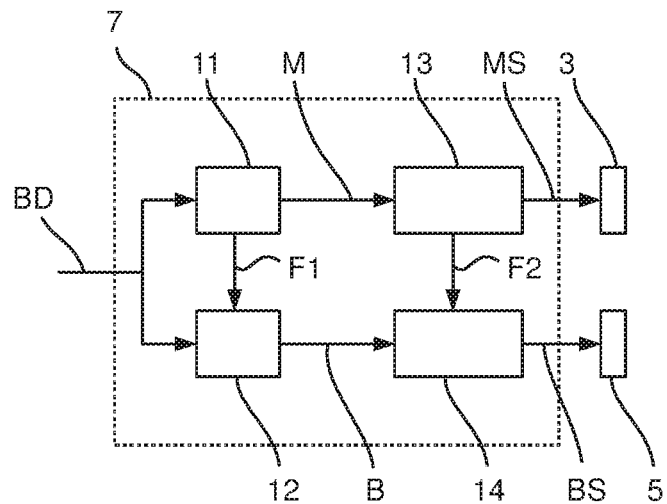
FIG. 3 is a schematic representation of the control unit of FIG. 1 for illustration of the generation of pulse-width modulated pattern and image control data MS, BS.

The image data BD are already in digital form with the appropriate pixel resolution for the image modulator 5 and are simultaneously entered into a first and second pattern generator 11 and 12 in the control unit 7, as shown schematically in FIG. 3. The first pattern generator 11 generates pattern data M which are entered into a first electronic control system 13 on the basis of the supplied image data BD. The first electronic control system 13 generates pulse-width modulated illumination control data MS on the basis of the pattern data M and enters them into the illumination modulator 3.

The second pattern generator 12 generates frame data B which are entered into a second electronic control system 14 for the image modulator 5 on the basis of the supplied image data BD. The second electronic control system 14 generates pulse-width modulated image control data BS and enters these into the image modulator 5.

According to the illumination and image control data MS, BS, during the frame duration T for generating the image, the illuminating and image pixels K1, K2 are brought into the first and second tilting position such that the desired image is generated and projected.

By connecting the two modulators 3, 5 in series and through the generation of the illumination and image control data MS, BS described below, an improvement in the representation of low grey shades or low brightness values is achieved on operation of the projector 1.

Figure 4:
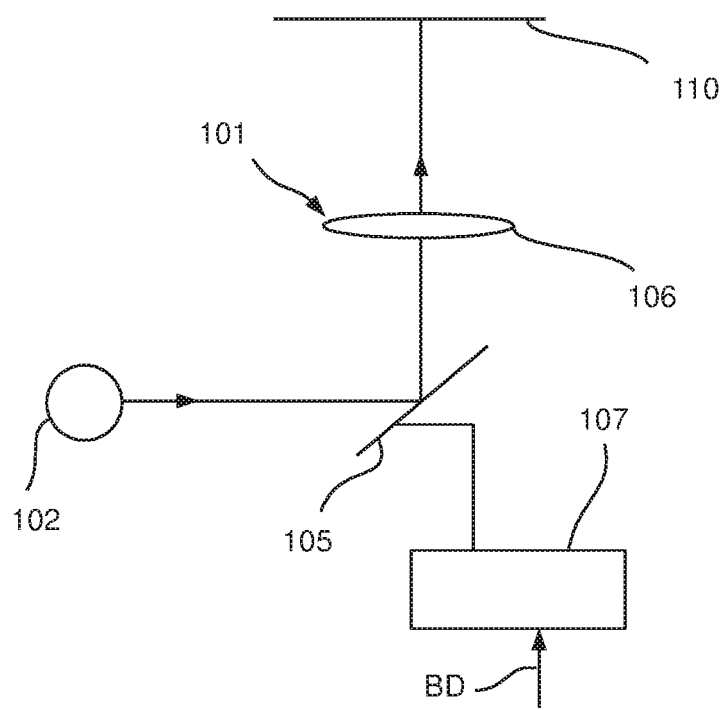
FIG. 4 is a schematic representation of a known projector with single modulation.

Projector 101 with Single Modulation According to FIG. 4

For better understanding of the projector 1 according to the invention, a projector 101 with single modulation comprising only one modulator 105 which is used as image modulator is described below (FIG. 4). This projector 101 with single modulation comprises a light source 102 and a projection optical system 106, wherein the modulator 105, which can be designed as a tilting mirror matrix, is illuminated with light from the light source 102. The modulator 105 modulates the light by means of the tilting mirrors of the modulator 105 which can be controlled independently of each other in order to generate an image which is projected by means of the projection optical system 106 onto a projection surface 110. The modulation is controlled by a control unit 107 on the basis of supplied image data BD. In the case of such a conventional projector 101, the contrast (maximum brightness to minimum brightness) is as a rule between 500:1 and 2000:1. This means that by reducing an input grey-scale value the projected brightness does not tend towards zero but instead approaches a finite value which is achieved for an input grey-scale value 0 and arises from the contrast of the projector 101. For the following discussion it is assumed that the brightness values are represented in an 8-bit system by integers from 0 to 255, wherein 0 represents the minimum brightness (black) and 255 the maximum brightness.

Figure 5:
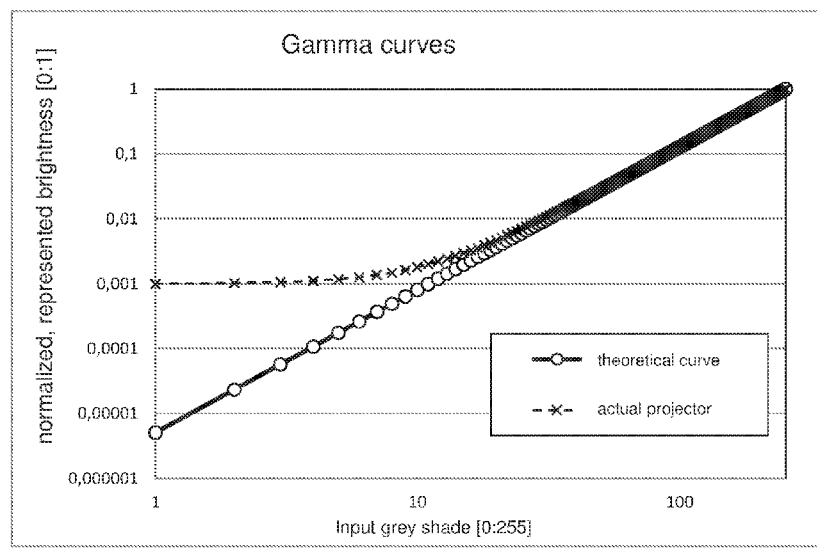
FIG. 5 is a schematic representation for comparison of the theoretical γ curve with the actual γ curve of the projector according to FIG. 4.

This is represented schematically in FIG. 5, wherein the theoretical γ curve (here with γ=2.2) is depicted as a continuous line with the actual curve for the projector 101 having a contrast of 1000:1 as a dashed line. Along the x-axis the input grey shades are shown and along the y-axis the normalized brightness in the range from 1E-6 to 1 is shown.

Mathematically the brightness curve $I_{sota}$ (sota=state of the art) results from the fact that the finite contrast K at a background brightness of U=1/K leads to the following equation for $I_{sota}(g)$.

$$I_{sota}(g) = U + (1-U) \cdot \left(\frac{g}{255}\right)^\gamma$$

Here g is the input grey shade and γ is the so-called γ value for the description of the brightness curve. Moreover the maximum brightness (for g=255) is normalized to 1. The theoretical brightness curve is defined as follows.

$$I_{theory}(g) := \left(\frac{g}{255}\right)^\gamma$$

This unavoidable background brightness U means that the lowest input grey shades in the image can no longer be distinguished in the case of dark image contents since they no longer stand out against the background brightness. Thus the grey shade g=4 in the example according to FIG. 5 is just about 10% brighter than the background in the case of the grey shade g=0. As a result the actually usable range of grey shades is decreased.

Figure 6:
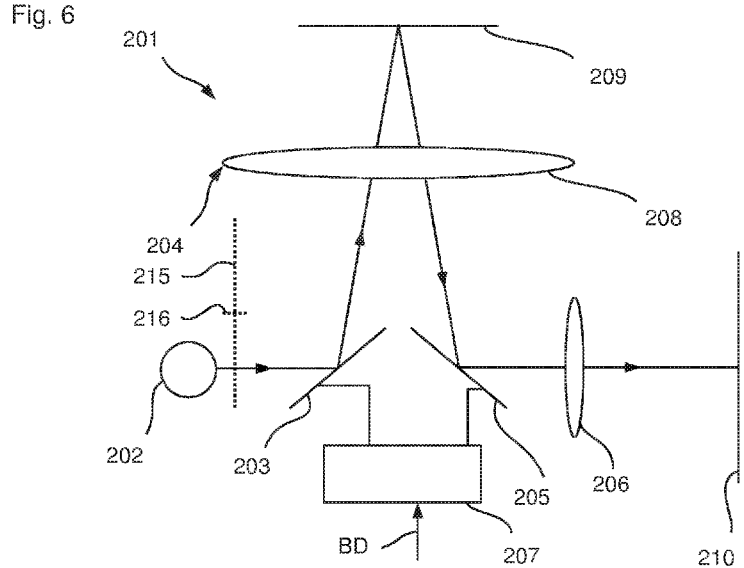
FIG. 6 is a representation of a known projector with dual modulation.

Projector 201 with Dual Modulation According to FIG. 6

With the use of two modulators 203 and 205 connected in series, as is the case in the projector 201 with dual modulation in FIG. 6, not only the contrast is increased to beyond 1,000,000:1. In addition the dark grey shades also have lower background brightness (since they are illuminated with less intensity).

The projector 201 is basically constructed in the same manner as the projector 1 in FIG. 1. Identical or similar elements are therefore denoted by reference numbers which are larger by 200 than the corresponding reference numbers in FIG. 1. Below only the differences are described, which essentially relate to the control unit 207 and the control of the modulators 203 and 205. For the projector 201 according to FIG. 6, the intensity curve indicated below results $$I_{2xDMD}(g_1, g_2) = \frac{1}{T}\int_0^T (I_1(g_1, t) \cdot I_2(g_2, t))dt =$$

$$\frac{1}{T}\int_0^T \{U + (1-U) \cdot i_1(g_1, t)\} \cdot \{U + (1-U) \cdot i_2(g_2, t)\}dt$$

Here T=1/f (frame duration T) is the time that is required at a frame rate f for the representation of one frame (single image). The functions $i_1(g_1, t)$ and $i_2(g_2, t)$ describe as a function of an input grey-scale value $g_1$ and $g_2$ respectively at which times t a tilting mirror of the modulators 203, 205 transfers light (i.e. the function has the value 1) or transfers no light (i.e. the function has the value 0). The functions $i_1$ and $i_2$ thus adopt only the values 0 and 1 at times. It results from this that there is a time $T_1 \leq T$ for which both modulators 203, 205 are set to black. Furthermore there is a time $T_2 \leq T$ for which precisely one of the two modulators 203, 205 is set to black (function value of $i_1$ or $i_2$ is 0), while the other is white ($i_1$ or $i_2$ is 1). Finally there is a time $T_3 \leq T$ for which both modulators 203, 205 are white ($i_1$ and $i_2$ are 1). $T_1+T_2+T_3=T$. It follows from these considerations that:

$$I_{2xDMD}(g_1, g_2) = \frac{1}{T}\left\{\int_{T_1} U^2 dt + \int_{T_2} U dt + \int_{T_3} 1 dt\right\} =$$

$$\frac{1}{T}\{T_1(g_1, g_2) \cdot U^2 + T_2(g_1, g_2) \cdot U + T_3(g_1, g_2)\}$$

Here the times $T_1$, $T_2$ and $T_3$ are functions of the input grey-scale values $g_1$ and $g_2$.

Figure 7:
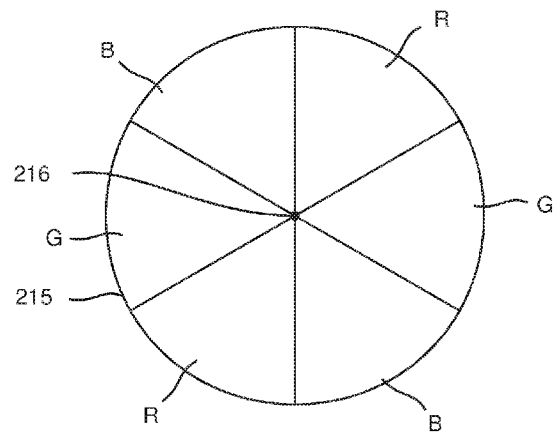
FIG. 7 is a schematic representation of the colour wheel.

The resulting projected brightnesses of such a projector 201 are illustrated using an example which follows. If coloured image generation is desired, a colour wheel 215 can be arranged in the beam path between the light source 202 and the first modulator 203, as represented by a dashed line in FIG. 6. The colours are then generated time-sequentially via the colour wheel 215 which is represented schematically with its axis of rotation 216. FIG. 7 shows a top view of the colour wheel 215 which comprises six colour segments of identical size (which thus cover an angle range of 60°). The colour segments are denoted by the capital letters R, G and B. This is intended to clarify that the corresponding colour segment only allows the red colour (in the case of R), the green colour (in the case of G) and the blue colour (in the case of B) to pass through, with the result that of the white light from the light source 202 time-sequentially red, green or blue light is incident on the illumination modulator 203. By means of the two modulators 203, 205 red, green and blue partial images can thus be projected one after the other. These are generated so quickly one after the other that a viewer can perceive only the overlapping and consequently a colour image. This can be achieved for example at an image rate or frame rate of f=60 Hz by rotating the colour wheel 215 with a frequency of 120 Hz. As a result, within one frame (single image) there are four red passes, four green passes and four blue passes. For each colour transition 15' are subtracted, the so-called spoke. During this time, the illumination modulator 203 is switched to dark in order to prevent undefined colour projection, just as a colour segment boundary of the colour wheel 215 crosses the illumination light. For a colour modulation, four time segments with a colour wheel segment size of 45° thus remain per colour (red, green and blue). This corresponds, at a frame rate of 60 Hz, to a time of $$T_{RGB} := T_R = T_G = T_R = \frac{4 * 45°}{720°} * \frac{1}{60 \text{ Hz}} = 4167\mu s$$

The minimum time for which a tilting mirror K1, K2 can transfer light or not (LSB, Least Significant Bit) is assumed to be the following $$t_{LSB} = 2 * 25 \text{ }\mu s$$

The factor 2 results from the fact that in two of the four colour revolutions of a frame a time slice of 25 µs is used to represent the LSB. If this time is considered in relation to the overall duration of a colour ($T_{RGB}$), a brightness of 0.012 results, which corresponds to a grey shade of approximately 34 (at γ=2.2).

By means of a spatial and temporal dithering, this value can be further reduced by a factor $n_{dither}$. For the limit value below which all grey shades have to be "dithered", $$I_{theory}(g) := \left(\frac{g}{255}\right)^\gamma$$

gives the following grey-scale value $g_{dither}$ $$g_{dither} = 255 * \left(\frac{t_{LSB}}{T_{RGB}}\right)^{1/\gamma}$$

Via the dither method, brightnesses can be generated in discrete gradations for the lowest grey shades (in the example up to grey shade 34). The minimum effective on-time for a tilting mirror (averaged over 256 frames/single images) is then $$t_{min} = t_{LSB}/n_{dither} = 2 * 25 \text{ }\mu s/256 \approx 2 \text{ }\mu s$$

For this example a dither resolution of 8 bits was selected, which gives $n_{dither}$=256. In order to represent a defined grey shade $g \leq g_{dither}$, n times the minimum on-time $t_{min}$ is required, which is calculated as follows.

$$n(g) = \left[\!\left[\left(\frac{g}{255}\right)^\gamma \cdot \frac{T_{RGB}}{t_{LSB}}\right]\!\right]$$

Here the operator [[ . . . ]] rounds up to the nearest natural number (including 0). In this example, the smallest brightness value that can be represented thus corresponds to $t_{min}/T_{RGB}$=4.69·10$^{-5}$. Table 1 below shows, in the Brightness theoretical column, that this corresponds approximately to grey shade 3 in a theoretical system with single modulation (as in the case of the projector 101 with single modulation). The Brightness "s.o.t.a." column relates to the projector 101 with single modulation and the Brightness with 2×DMD column corresponds to the projector 201 with dual modulation.

TABLE 1

| Grey shade input [0:255] | Brightness theoretical [0:1] | Brightness "s.o.t.a." [0:1] | Brightness with 2×DMD [0:1] |
| --- | --- | --- | --- |
| 0 | 0 | 1.00E−03 | 1.00E−06 |
| 1 | 5.08E−06 | 1.01E−03 | 1.00E−06 |
| 2 | 2.33E−05 | 1.02E−03 | 1.00E−06 |
| 3 | 5.69E−05 | 1.06E−03 | 1.20E−04 |
| 4 | 1.07E−04 | 1.11E−03 | 1.67E−04 |
| 5 | 1.75E−04 | 1.17E−03 | 2.60E−04 |
| 6 | 2.62E−04 | 1.26E−03 | 3.54E−04 |
| 7 | 3.67E−04 | 1.37E−03 | 4.48E−04 |
| 8 | 4.93E−04 | 1.49E−03 | 5.88E−04 |
| 9 | 6.38E−04 | 1.64E−03 | 7.29E−04 |
| 10 | 8.05E−04 | 1.80E−03 | 8.69E−04 |
| 11 | 9.92E−04 | 1.99E−03 | 1.06E−03 |
| 12 | 1.20E−03 | 2.20E−03 | 1.29E−03 |
| 13 | 1.43E−03 | 2.43E−03 | 1.52E−03 |
| 14 | 1.69E−03 | 2.69E−03 | 1.76E−03 |
| 15 | 1.96E−03 | 2.96E−03 | 2.04E−03 |
| 16 | 2.26E−03 | 3.26E−03 | 2.32E−03 |
| 17 | 2.59E−03 | 3.58E−03 | 2.65E−03 |
| 18 | 2.93E−03 | 3.93E−03 | 3.02E−03 |
| 19 | 3.30E−03 | 4.30E−03 | 3.35E−03 |
| 20 | 3.70E−03 | 4.69E−03 | 3.77E−03 |

It is therefore not possible by means of the projector 201 with dual modulation to represent the grey shade 0, 1 or 2.

If the image is addressed on the image modulator 205 according to the Phased-Reset method (in which the pixels are switched successively blockwise, as described in detail e.g. in the article "10.4: Phased Reset Timing for Improved Digital Micromirror Device (DMD) Brightness"; D. Doherty, G. Hewlett; SID Symposium Digest of Technical Papers, 29: 125-128. doi: 10.1889/1.1833710) and each of the 16 reset zones is temporally offset with respect to the previous reset zone by $t_{reset}=8$ μs, in the time $$\frac{T_{LSB}}{2} = \frac{t_{LSB}}{2} + 15 * t_{reset} = 145 \mu s$$

the LSBs of all 16 reset zones are represented. The factor ½ results from the fact that in one frame the LSB is spread over two periods of the colour wheel.

This time can only be utilized for an illumination by the illumination modulator 203, which is addressed according to the global reset method (in which all pixels are switched simultaneously, as described in detail e.g. in the same SID article as above). In this example the illumination time for the LSB is selected to be a little longer.

$$\tau_{LSB}=2*150 \mu s=300 \mu s$$

The factor 2 again results from the fact that the LSB is spread over two of the four RGB colour passes. The LSB, by means of which the lowest 34 grey shades can be modulated (via temporal dithering), is used in two of the four colour passes when using a 4× colour wheel 215 (four colour passes in one frame). For a representation of grey-scale values which only require the LSB for a representation (via spatial and temporal dithering up to for example grey shade 34), from RGB=(3,3,3)–here in the example n (g=3)=1, while for n (g≤3)=0 is rounded down–illumination light is guided via the illumination modulator for the time $$\tau=3*300 \mu s=900 \mu s$$

onto the image modulator (three colours). This means that for 900 μs·60 Hz=5.4% of the time of one frame the illumination modulator 203 transfers light onto the image modulator 205. In order to calculate the projected brightnesses for input grey-scale values $3 \leq g \leq g_{dither}$, the times $T_1$, $T_2$ and $T_3$ are to be considered and the following results:

$$T_1(g)=T_R+T_G+T_B-\tau=12500 \mu s-\tau=1160 \mu s$$

$$T_2(g)=\tau-3 \cdot n(g) \cdot t_{min}$$

$$T_3(g)=3 \cdot n(g) \cdot t_{min}$$

The factor 3 results from the three colours red, green and blue. For g<3, $T_1(g)=T_R+T_G+T_B$ and $T_2(g)=T_3(g)=0$. Using the above formula for $I_{2DMD}(g_1, g_2)$, the brightness curve can thus be calculated for the lowest grey shades in the case of the projector 201 with tilting mirror matrix dual modulation. The results are shown in addition to Table 1 in FIGS. 8 and 9 below. For the dark grey shades there is according to this solution a significant improvement over the state of the art with single modulation (image generation by means of a projector with single modulation).

Figure 8:
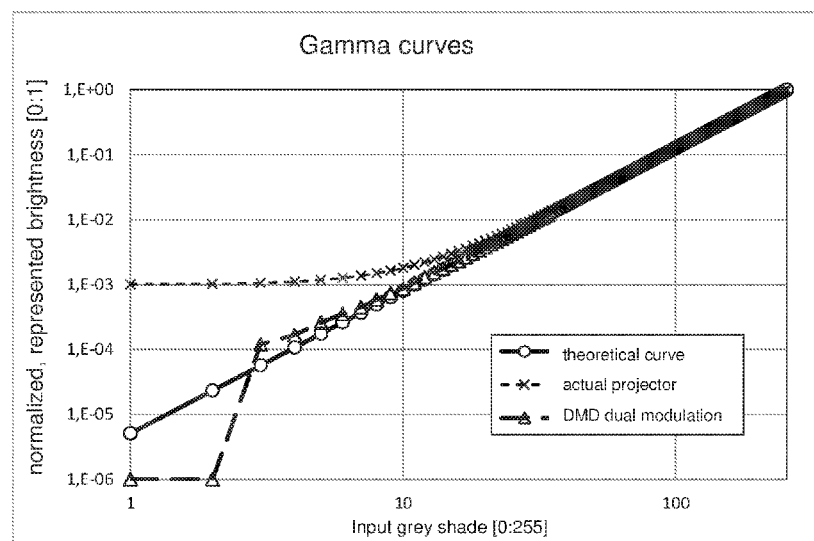

In FIG. 8, for comparison, the theoretical γ curve (in the example with γ=2.2) is depicted as a continuous line, the actual curve for the projector 101 with single modulation for a contrast K=1000:1 is depicted as a dashed line and the actual curve for the projector 201 with dual modulation is depicted as a long-dashed line. Along the x-axis the input grey shade in the range from 1 to 255 is plotted and along the y-axis the normalized brightness in the range from $1 \cdot 10^{-6}$ to 1 is plotted.

Figure 9:
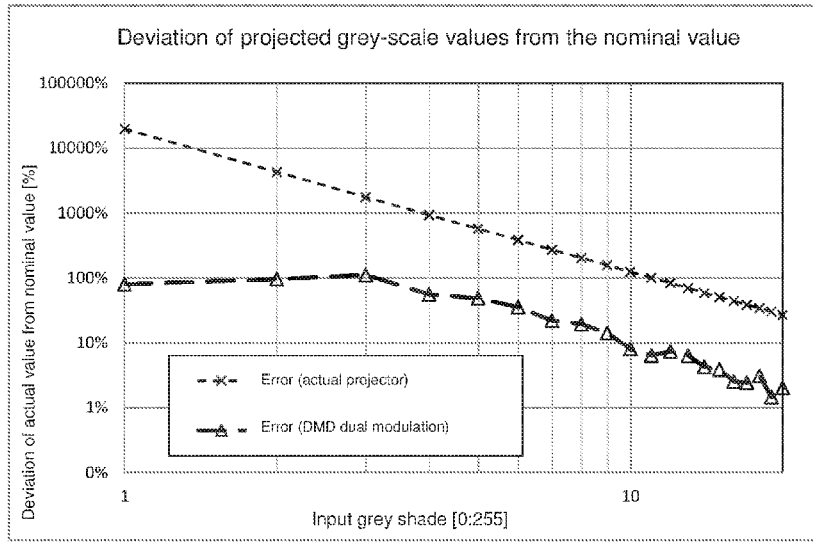
FIG. 9 is a representation of the deviation of projected grey-scale values from the nominal value for a projector with single modulation and a projector with dual modulation.

In FIG. 9, the percentage deviation of the projected grey-scale value from the nominal value for the lowest 20 grey shades is depicted as a dashed line for the projector 101 with single modulation and as a long-dashed line for the projector 201 with dual modulation. Along the x-axis here the input grey shade in the range from 0 to 20 is plotted and along the y-axis the deviation of the actual value from the nominal value in percent is plotted (amount of the actual value minus nominal value divided by the nominal value).

It can be seen that, for low grey-scale values, the deviation of the projected brightnesses from the nominal brightnesses is smaller by more than one order of magnitude with the projector 201 with dual modulation compared with the projector 101 with single modulation. However, the deviation from the nominal value also remains above a perception threshold for brightness deviations of 10% in the case of the projector 201 with dual modulation for grey shades smaller than 10.

A further disadvantage in the case of the projector 201 with dual modulation consists in that, as explained above, the lowest grey shades have to be generated via a dithering (in the example up to grey shade 34). This means that the brightness at such a grey-scale value is spread over several pixels and/or over several frames. If the viewer is close to the projection surface (or the pixels occupy a certain angle size), flickering is visible, which is perceived as annoying. In addition it may occur that the lowest grey shades can no longer be represented via a dithering. In the case of the described projector 201 with dual modulation, the grey shades 0, 1 and 2 are identical with the background and the brightnesses are only modulated from grey shade 3.

Projector 1 According to the Invention

In the case of the projector 1 according to the invention, the control of the modulators 3 and 5 is realized such that a dithering does not have to be used for low grey-scale values. The annoying image impression brought about by the dithering can be significantly reduced. Furthermore the very lowest grey shades can in addition be represented so as to be distinguishable.

This is achieved in that, for dark grey shades (grey shades the values of which are less than or equal to a threshold value and obviously larger than zero), the illumination and image control data MS, BS are generated in such a way that the illumination modulator 3 makes no light available and the image modulator 5 carries out a brightness modulation anyway. The modulation by means of the image modulator 5 takes into account the fact that an illumination only takes place by means of the unavoidable residual light (background brightness U of the illumination modulator 3) so that the image modulator 5 is controlled as though it was to generate a brighter grey-scale value. All brightnesses which are lower than the background brightness of the illumination modulator 3 are thus modulated by the image modulator 5. The control of the image modulator 5 here corresponds to a brightness or a grey shade which is multiplied by the contrast value of the illumination modulator 3 while taking the selected γ value into account. The projector 1 can in the same way as the projector 201 with dual modulation comprise a colour wheel 15 in order to be able to generate and project multicoloured images.

In other words, for the representation of the low grey shades the threshold value), the illumination modulator 3 is set to black, while the grey shades of the image modulator 5 are increased (boosted) by the contrast of the illumination modulator. The distinction between the normal representation and boosted pixels takes place at the pixel level, as is also described in detail below. In the case of a projector 1 with tilting mirror dual modulation, through the representation of the dark grey shades via boosted (increased) grey-scale values on the image modulator 5, these no longer have to be generated by a dithering, with the result that all brightnesses represented boosted do not flicker and do not irritate the viewer. Moreover even the lowest grey-scale values can be represented so as to be distinguishable.

For the subsequent observation it is assumed that the intermediate imaging by means of the imaging optical system 4 from the illumination modulator 3 onto the image modulator 5 contains no image errors, with the result that light from each pixel K1 of the illumination modulator 3 is directed onto precisely the one assigned pixel K2 (and only this pixel) of the image modulator 5.

If the illumination modulator 3 is switched to black (grey shade 0, $g_1=0$) and the image modulator 5 to white (grey shade 255, $g_2=255$), a value which corresponds to the background of a projector 101 with single modulation consequently results as projected brightness. In the named example with a projector 101, the imaging system of which has a contrast of K=1000:1 and γ=2.2, this background brightness (U=1/K=0.001) corresponds approximately to the grey shade 11 of an ideal projector (cf. Table 1). This results from the fact that the dependence of the projected (normalized) brightness $I_{theor}$ on a grey shade g is given as $$I_{theor}(g) := \left(\frac{g}{255}\right)^\gamma$$

It follows from this, for a threshold grey shade $g_{threshold}$ (=threshold value):

$$g_{threshold} = 255 \cdot (U)^{1/\gamma} = 11.03 \approx 11$$

If both modulators 3, 5 have the same background brightness U, for the brightness curve as a function of the input grey-scale values $g_1$ and $g_2$, the following formula results $$I_{dual}(g_1, g_2) = i_{sota}(g_1) * I_{sota}(g_2) = \left\{U + (1-y)\cdot\left(\frac{g_1}{255}\right)^\gamma\right\} * \left\{U + (1-y)\cdot\left(\frac{g_2}{255}\right)^\gamma\right\}$$

For $g_1=0$, the following results as projected brightness after a dual modulation $$I_{dual}(g_1=0, g_2) = U * \left\{U + (1-U)\cdot\left(\frac{g_1}{255}\right)^\gamma\right\}$$

The grey-scale value $g_2$ for the image modulator 5 is now sought in order to represent any desired grey shade which is smaller than the threshold grey shade ($g=g_{threshold}$) by means of dual modulation.

$$I_{dual}(g_1=0, g_2) = I_{theor}(g)$$

This equation can be solved for $g_2$.

$$g_2 = \left[\left[255 \cdot \left[\left(\frac{\left(\frac{g}{255}\right)^\gamma}{U} - U\right) / (1-U)\right]^{1/\gamma}\right]\right]$$

Here $g_2$ is rounded to a natural number between 0 and 255, as the operator [ . . . ]] indicates.

In order to represent the grey shade g=3 for example, $g_1=0$ is used for the illumination modulator 3 and $g_2=69$ is set for the image modulator 5. The image modulator 5 thus uses an inflated (boosted) value compared with the grey-scale value actually desired (here grey shade g=3).

Since the illumination and image control data MS, BS are generated as pulse-width modulated control data, they can also be characterized by means of their duty factor (or duty cycle). Without the boosting according to the invention, the image control data BS would have a duty factor range from 0 to 255, wherein at zero (=minimum duty factor) the tilting mirrors K2 are in the second tilting position for the entire frame duration T and at 255 (=maximum duty factor) they are in the first tilting position for the entire frame duration T. At duty factor values between 0 and 255, the tilting mirror K2 is in the first tilting position for a first period Δt1 and in the second tilting position for a second period Δt2, wherein Δt1+Δt2=T. The second period Δt2 is thus longer the greater the duty factor value is. As a rule the tilting mirror K2 is switched back and forth several times between its two tilting positions at duty factor values between 0 and 255, with the result that the two periods Δt1 and Δt2 are composed of temporal subdivisions.

For the image control data BS, the boosting provides a first duty factor range for grey-scale values greater than the predetermined threshold value and a second duty factor range for grey-scale values which are not greater than the predetermined threshold value. The first duty factor range comprises the conventional values for values greater than the predetermined threshold value, which corresponds e.g. to the grey-scale value 11. The lower limit of the first duty factor range would thus be at the grey-scale value 12 and the duty factor value for this grey-scale value is 12. The first duty factor range thus comprises values from 12 to 255.

The second duty factor range thus has its upper limit at the grey-scale value 11, wherein however the duty factor value for the grey-scale value 11 is e.g. 254. The lower limit of the second duty factor range is 21 in the example described here. The second duty factor range thus comprises values from 21 to 254.

Due to the boosting, at least the duty factor value at the upper limit of the second duty factor range (=boosted duty factor range) is greater than the duty factor value at the lower limit of the first duty factor range (=non-boosted duty factor range). In other words, the two duty factor ranges overlap.

A summary of the grey-scale values of the two modulators 3, 5 for the representation of a given grey shade g is indicated in Table 2 below. In the left-hand column the grey-scale values g from 1-15 to be represented by means of the projector 1 are indicated from the maximum possible range from 0-255. In the middle column the grey-scale value is indicated for the illumination modulator 3 and in the right-hand column the grey-scale value is indicated for the image modulator 5.

TABLE 2

| Grey shade g to be represented [0:255] | Grey-scale value g1 [0:255] | Grey-scale value g2 [0:255] |
|---|---|---|
| 1 | 0 | 21 |
| 2 | 0 | 45 |
| 3 | 0 | 69 |
| 4 | 0 | 92 |
| 5 | 0 | 115 |
| 6 | 0 | 138 |
| 7 | 0 | 162 |
| 8 | 0 | 185 |
| 9 | 0 | 208 |
| 10 | 0 | 231 |
| 11 | 0 | 254 |
| 12 | 255 | 12 |
| 13 | 255 | 13 |
| 14 | 255 | 14 |
| 15 | 255 | 15 |

It is clearly evident from this that, in the boosted second duty factor range, the illumination modulator 3 is switched to black (value 0) and the image modulator 5 has duty factor values (21-254) which are greater than corresponding duty factor values for the non-boosted case (1-11), which would be set e.g. in the case of the image modulator 205. From values above the threshold value g=11, the illumination modulator 3 is switched to white or maximum illumination intensity for the entire frame duration T (value 255) and the image modulator 5 is controlled by means of the corresponding grey-scale values $g_2$ (12, 13, 14, etc.). In the embodiment described here, even the duty factor value (=21) of the lower limit of the second duty factor range is above the duty factor value (=12) of the lower limit of the first duty factor range. The second duty factor range is thus completely within the first duty factor range.

Furthermore it is evident that a value only has to be dithered for the grey shade g=1 with $g_2=21 \leq 34$ to be represented. The irritations caused thereby are thus virtually completely avoided.

This type of generation of the illumination and image control data MS, BS is also referred to below as boost 1.

In the earlier description of the boosted pixels, the illumination modulator 3 was always switched to black, while the brightness modulation of the background light of the illumination modulator 3 was carried out by the image modulator 5. Of course the two modulators 3, 5 can be controlled in reverse for the boosting, with the result that for a boosted pixel the second modulator 5 is set to black, while the brightness modulation is carried out via the first modulator 3.

In order to illustrate the improvements achieved by means of the projector 1 according to the invention in an easily comprehensible manner, first of all the actually projected brightnesses are summarized for different projectors. For a theoretical (normalized) brightness curve as a function of a grey shade g, the following formula (already indicated) applies.

$$I_{theor}(g) = \left(\frac{g}{255}\right)^\gamma$$

If the background brightness is taken into account in an actual system according to the state of the art (projector 101 with single modulation), the following thus applies for the (normalized) brightness curve (see Table 1, Brightness "s.o.t.a." column):

$$I_{sota}(g) := U + (1 - U) \cdot \left(\frac{g}{255}\right)^\gamma$$

For the first solution (boost 1) introduced above, the following results due to the dual modulation $$I_{boost\,1}(g) = \begin{cases} U^2 & \text{for } g = 0 \rightarrow (g_1 = 0, g_2 = 0) \\ U \cdot \left\{U + (1-U) \cdot \left(\frac{g_1}{255}\right)^\gamma\right\} & \text{for } 0 < g \leq g_{threshold} \rightarrow \left(g_1 = 0, g_2 = 255 \cdot \left[\frac{\left(\frac{g}{255}\right)^\gamma - U}{1 - U}\right]^{\frac{1}{\gamma}}\right) \\ U + (1 - U) \cdot \left(\frac{g_2}{255}\right)^\gamma & \text{for } g > g_{threshold} \rightarrow (g_1 = 255, g_2 = g) \end{cases}$$

Table 3 summarizes the resulting projected brightness according to this method "boost 1" for the lowest 30 grey shades.

TABLE 3

| Grey shade input | Brightness theoretical | Brightness "s.o.t.a." | Error "s.o.t.a." | Grey shade "Boost 1" | | Brightness "boost 1" | Error "boost 1" |
|---|---|---|---|---|---|---|---|
| [0:255] | [0:1] | [0:1] | [%] | $g_1$ [0:255] | $g_2$ [0:255] | [0:1] | [%] |
| 0 | 0 | 1.00E−03 | | 0 | 0 | 1.00E−06 | |
| 1 | 5.08E−06 | 1.01E−03 | 19696% | 0 | 21 | 5.11E−06 | 0.7% |
| 2 | 2.33E−05 | 1.02E−03 | 4287% | 0 | 45 | 2.30E−05 | 1.4% |
| 3 | 5.69E−05 | 1.06E−03 | 1757% | 0 | 69 | 5.73E−05 | 0.7% |
| 4 | 1.07E−04 | 1.11E−03 | 933% | 0 | 92 | 1.07E−04 | 0.1% |
| 5 | 1.75E−04 | 1.17E−03 | 571% | 0 | 115 | 1.74E−04 | 0.5% |
| 6 | 2.62E−04 | 1.26E−03 | 382% | 0 | 138 | 2.60E−04 | 0.7% |
| 7 | 3.67E−04 | 1.37E−03 | 272% | 0 | 162 | 3.69E−04 | 0.6% |
| 8 | 4.93E−04 | 1.49E−03 | 203% | 0 | 185 | 4.94E−04 | 0.3% |
| 9 | 6.38E−04 | 1.64E−03 | 157% | 0 | 208 | 6.39E−04 | 0.2% |
| 10 | 8.05E−04 | 1.80E−03 | 124% | 0 | 231 | 8.05E−04 | 0.0% |
| 11 | 9.92E−04 | 1.99E−03 | 101% | 0 | 254 | 9.91E−04 | 0.1% |
| 12 | 1.20E−03 | 2.20E−03 | 83% | 255 | 12 | 2.20E−03 | 83% |
| 13 | 1.43E−03 | 2.43E−03 | 70% | 255 | 13 | 2.43E−03 | 70% |
| 14 | 1.69E−03 | 2.69E−03 | 59% | 255 | 14 | 2.69E−03 | 59% |
| 15 | 1.96E−03 | 2.96E−03 | 51% | 255 | 15 | 2.96E−03 | 51% |
| 16 | 2.26E−03 | 3.26E−03 | 44% | 255 | 16 | 3.26E−03 | 44% |
| 17 | 2.59E−03 | 3.58E−03 | 39% | 255 | 17 | 3.58E−03 | 39% |
| 18 | 2.93E−03 | 3.93E−03 | 34% | 255 | 18 | 3.93E−03 | 34% |
| 19 | 3.30E−03 | 4.30E−03 | 30% | 255 | 19 | 4.30E−03 | 30% |
| 20 | 3.70E−03 | 4.69E−03 | 27% | 255 | 20 | 4.69E−03 | 27% |
| 21 | 4.12E−03 | 5.11E−03 | 24% | 255 | 21 | 5.11E−03 | 24% |
| 22 | 4.56E−03 | 5.56E−03 | 22% | 255 | 22 | 5.56E−03 | 22% |
| 23 | 5.03E−03 | 6.02E−03 | 20% | 255 | 23 | 6.02E−03 | 20% |
| 24 | 5.52E−03 | 6.52E−03 | 18% | 255 | 24 | 6.52E−03 | 18% |
| 25 | 6.04E−03 | 7.03E−03 | 16% | 255 | 25 | 7.03E−03 | 16% |
| 26 | 6.58E−03 | 7.58E−03 | 15% | 255 | 26 | 7.58E−03 | 15% |
| 27 | 7.16E−03 | 8.15E−03 | 14% | 255 | 27 | 8.15E−03 | 14% |
| 28 | 7.75E−03 | 8.74E−03 | 13% | 255 | 28 | 8.74E−03 | 13% |
| 29 | 8.37E−03 | 9.36E−03 | 12% | 255 | 29 | 9.36E−03 | 12% |
| 30 | 9.02E−03 | 1.00E−02 | 11% | 255 | 30 | 1.00E−02 | 11% |

It is evident that, for grey shades which are less than or equal to the threshold grey shade $g_{threshold}$ (=11), the theoretical brightnesses up to approximately 1% are achieved. For grey shades which are marginally brighter, there are however considerable deviations (up to about 80% for the first grey shade above the threshold grey shade).

In order further to reduce the described deviations from the nominal value for grey shades above the grey shade threshold ($g > g_{threshold}$), in a development of the boost 1 variant, the grey-scale values $g_2$ of the image modulator 5 can be selected in such a way that they achieve the theoretical brightnesses for an actual projector 1 with an actual background brightness U (by virtue of the choice of $g_1$=255) (this is also referred to below as "boost 2"). A $g_2'$ is thus sought for which the following requirement applies:

$$I_{duel}(g_1=1, g_2')=I_{theor}(g) \text{ for all } g_{threshold} < g \leq 255$$

This is fulfilled for $$g_2' = \left[\left[255 \cdot \left(\frac{\left(\frac{g}{255}\right)^\gamma - U}{1-U}\right)^{\frac{1}{\gamma}}\right]\right]$$

This value is rounded to a natural number between 0 and 255, as the operator indicates. For the case considered here with a contrast of K=1000:1 and γ=2.2, the resulting grey-scale values $g_2'$ are entered in Table 3.

For the variant "boost 2" the following brightnesses arise:

$$I_{boost\,2}(g) = \begin{cases} U^2 & \text{for } g = 0 \rightarrow (g_1 = 0, g_2' = 0) \\ U \cdot \left\{U + (1-U) \cdot \left(\frac{g_2'}{255}\right)^\gamma\right\} & \text{for } 0 < g \leq g_{threshold} \rightarrow \left(g_1 = 0, g_2' = 255 \cdot \left[\frac{\left(\frac{g}{255}\right)^\gamma - U}{1-U}\right]^{\frac{1}{\gamma}}\right) \\ U + (1-U) \cdot \left(\frac{g_2'}{255}\right)^\gamma & \text{for } g > g_{threshold} \rightarrow \left(g_1 = 255, g_2' = 255 \cdot \left[\frac{\left(\frac{g}{255}\right)^\gamma - U}{1-U}\right]^{\frac{1}{\gamma}}\right) \end{cases}$$

These values are entered in Table 4 below.

TABLE 4

| Grey shade input [0:255] | Brightness theoretical [0:1] | Brightness "s.o.t.a." [0:1] | Error "s.o.t.a." [%] | Grey shade "boost 2" $g_1$ [0:255] | $g_2'$ [0:255] | Brightness "boost 2" [0:1] | Error "boost 2" [%] |
|---|---|---|---|---|---|---|---|
| 0 | 0 | 1.00E-03 | | 0 | 0 | 1.00E-06 | |
| 1 | 5.08E-06 | 1.01E-03 | 19696% | 0 | 21 | 5.11E-06 | 0.7% |
| 2 | 2.33E-05 | 1.02E-03 | 4287% | 0 | 45 | 2.30E-05 | 1.4% |
| 3 | 5.69E-05 | 1.06E-03 | 1757% | 0 | 69 | 5.73E-05 | 0.7% |
| 4 | 1.07E-04 | 1.11E-03 | 933% | 0 | 92 | 1.07E-04 | 0.1% |
| 5 | 1.75E-04 | 1.17E-03 | 571% | 0 | 115 | 1.74E-04 | 0.5% |
| 6 | 2.62E-04 | 1.26E-03 | 382% | 0 | 138 | 2.60E-04 | 0.7% |
| 7 | 3.67E-04 | 1.37E-03 | 272% | 0 | 162 | 3.69E-04 | 0.6% |
| 8 | 4.93E-04 | 1.49E-03 | 203% | 0 | 185 | 4.94E-04 | 0.3% |
| 9 | 6.38E-04 | 1.64E-03 | 157% | 0 | 208 | 6.39E-04 | 0.2% |
| 10 | 8.05E-04 | 1.80E-03 | 124% | 0 | 231 | 8.05E-04 | 0.0% |
| 11 | 9.92E-04 | 1.99E-03 | 101% | 0 | 254 | 9.91E-04 | 0.1% |
| 12 | 1.20E-03 | 2.20E-03 | 83% | 255 | 5 | 1.17E-03 | 2.2% |
| 13 | 1.43E-03 | 2.43E-03 | 70% | 255 | 8 | 1.49E-03 | 4.1% |
| 14 | 1.69E-03 | 2.69E-03 | 59% | 255 | 9 | 1.64E-03 | 2.9% |
| 15 | 1.96E-03 | 2.96E-03 | 51% | 255 | 11 | 1.99E-03 | 1.4% |
| 16 | 2.26E-03 | 3.26E-03 | 44% | 255 | 12 | 2.20E-03 | 2.8% |
| 17 | 2.59E-03 | 3.58E-03 | 39% | 255 | 14 | 2.69E-03 | 3.8% |
| 18 | 2.93E-03 | 3.93E-03 | 34% | 255 | 15 | 2.96E-03 | 1.0% |
| 19 | 3.30E-03 | 4.30E-03 | 30% | 255 | 16 | 3.26E-03 | 1.3% |
| 20 | 3.70E-03 | 4.69E-03 | 27% | 255 | 17 | 3.58E-03 | 3.1% |
| 21 | 4.12E-03 | 5.11E-03 | 24% | 255 | 19 | 4.30E-03 | 4.5% |
| 22 | 4.56E-03 | 5.56E-03 | 22% | 255 | 20 | 4.69E-03 | 2.9% |
| 23 | 5.03E-03 | 6.02E-03 | 20% | 255 | 21 | 5.11E-03 | 1.7% |
| 24 | 5.52E-03 | 6.52E-03 | 18% | 255 | 22 | 5.56E-03 | 0.6% |
| 25 | 6.04E-03 | 7.03E-03 | 16% | 255 | 23 | 6.02E-03 | 0.3% |
| 26 | 6.58E-03 | 7.58E-03 | 15% | 255 | 24 | 6.52E-03 | 1.0% |
| 27 | 7.16E-03 | 8.15E-03 | 14% | 255 | 25 | 7.03E-03 | 1.7% |
| 28 | 7.75E-03 | 8.74E-03 | 13% | 255 | 26 | 7.58E-03 | 2.2% |
| 29 | 8.37E-03 | 9.36E-03 | 12% | 255 | 27 | 8.15E-03 | 2.7% |
| 30 | 9.02E-03 | 1.00E-02 | 11% | 255 | 28 | 8.74E-03 | 3.1% |

In the variant "boost 2", the first duty factor range runs from 5 to 255 and the second duty factor range runs from 21 to 254. Also in the variant "boost 2", the duty factor value of the upper limit of the second duty factor range is greater than the duty factor value of the lower limit of the first duty factor range. In particular the second duty factor range is completely in the first duty factor range.

With the variant "boost 2", the deviation of the projected brightnesses from the theoretical values is thus no longer greater than 5%. This is achieved by adjusting the first duty factor range accordingly (in particular for grey-scale values which are only slightly greater than the threshold value). The second duty factor range of the variant "boost 2" is identical to the second duty factor range of the variant "boost 1".

In Tables 3 and 4, the brightnesses of the projector according to the invention are shown as a function of the grey shades up to 30 to be represented (for γ=2.2). The brightnesses for a perfect (theoretical) system, for the projector 101 with single modulation according to the state of the art ("s.o.t.a."), which comprises only a single image modulator 105 and has a contrast of K=1000:1, and for the variants "boost 1" and "boost 2" according to the invention are compared. The deviation of the solutions from the nominal value is also indicated.

Figure 10:
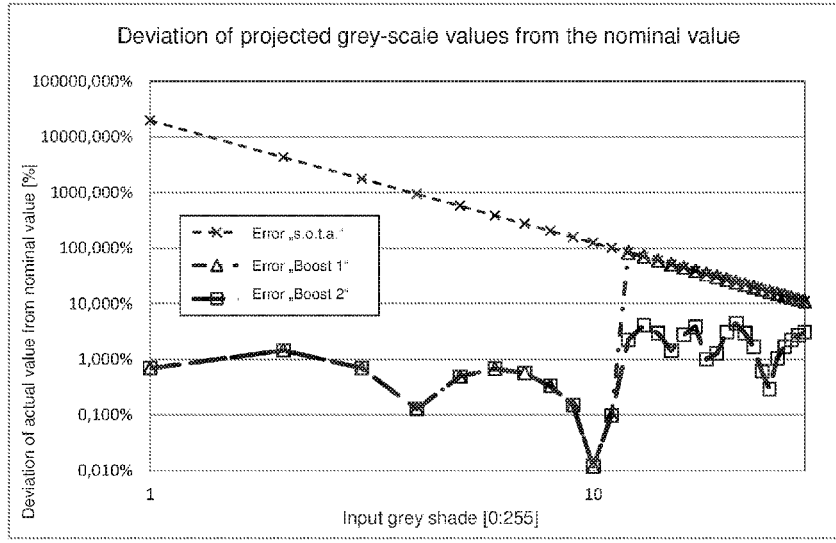
FIG. 10 is a representation of the deviation of the projected grey-scale values from the nominal value for the variants according to the invention boost1 and boost2.

In FIG. 10, the percentage deviations of the projected grey-scale value from the nominal value for the lowest 30 grey shades are shown for the projector 101 with single modulation according to the state of the art (dashed), the projector 1 according to the invention according to variant "boost 1" (dot-dash line) and the projector 1 according to the invention according to "boost 2" (long-dashed).

It is evident from FIG. 10 that the variants "boost1" and "boost2" give identical results for the boosted grey-scale values (=grey-scale values 1 to 11), which of course results from the second duty factor range being identical for both variants. For grey-scale values greater than the threshold value (than grey-scale values 12 and above), the variant "boost2" gives better results which decrease with an increasing grey-scale value. This improvement is achieved in that, from the input grey-scale value 12, the residual light which is unavoidable is also taken into account. This leads to an actuation of the second pixels by means of a lower brightness than the input brightness (at the input brightness 12 the second pixel is actuated e.g. by means of the brightness value 6; Table 3). As a result this leads to the described improvement.

In a further development of the variant "boost1", which is referred to as "boost 3", the following procedure may be used. The fact is taken into account here that the tilting mirror matrices allow fine tuning of the synchronous switching of the tilting mirrors K1, K2. Furthermore the grey-scale values or brightness values are indicated for each of the three primary colours red, green and blue, which is evident from the use of $T_{RGB} := T_R = T_G = T_B$.

Since the two modulators 3, 5 are controlled by means of pulse-width modulation, the following formula is to be used for the calculation of the projected brightnesses:

$$I_{2xDMD}(g_1'', g_2'') = \frac{T_1(g_1'', g_2'') \cdot U^2 + T_2(g_1'', g_2'') \cdot U + T_3(g_1'', g_2'')}{T}$$

Here there are discrete brightness increments which can be represented via a pulse-width modulation. For the subsequent observations it is assumed that $t_{min}$ is the minimum effective on-time of a tilting mirror K1, K2 (=period for which the tilting mirror is in its first tilting position) and that all brightnesses are given via multiples n of this time.

The represented grey-scale values are determined as follows:

The grey-scale value 0 is represented by setting both DMDs to black, i.e. $g_1 = g^*_2 = 0$ or $n_1 = n_2 = 0$.

For the boosted grey-scale values with $0 < g \leq g_{threshold}$, one of the modulators 3, 5 is set to black (e.g. $g_1 = 0$ or $n_1 = 0$), while the other modulator represents a grey-scale value $g^*_2$ (or a multiple $n_2$ of the minimum effective on-time $3 \cdot t_{min}$ for all three colours), in order to satisfy the theoretical brightness. The following requirement consequently results:

$$I_{theor}(g) = I_{2xDMD}(g_1=0, g^*_1)$$

Since one of the modulators 3, 5 is always set to black, $T_3 = 0$ results here. For the time $T_2$ for which only one of the modulators 3, 5 is white, the following applies:

$$T_2 = 3 \cdot n_2 \cdot t_{min}$$

It thus follows for the time for which both modulators 3, 5 are set to black:

$$T_1 = 3 \cdot T_{RGB} - T_2 = 3 \cdot T_{RGB} - 3 \cdot n_2 \cdot t_{min}$$

It thus follows from $I_{theor}(g)$:

$$\left(\frac{g}{255}\right)^\gamma = \frac{1}{T}\{T_1 \cdot U^2 + T_2 \cdot U + T_3\} = \frac{3 \cdot n_2 \cdot t_{min} \cdot U \cdot (1-U)}{3 \cdot T_{RGB}} + U^2$$

It follows from this:

$$n_2(0 < g \leq g_{threshold}) = \left\lceil \frac{T_{RGB} \cdot \left(\left(\frac{g}{255}\right)^\gamma - U^2\right)}{t_{min} \cdot U \cdot (1-U)} \right\rceil$$

This corresponds to an input grey-scale value $g^*_2$ for the second modulator 3, 5 of:

$$g''_2(0 < g \leq g_{threshold}) = \left\lceil 255 \cdot \left(\frac{n_2(g) \cdot t_{min}}{T_{RGB}}\right)^{1/\gamma} \right\rceil$$

For grey-scale values which are not boosted but are dithered ($g_{threshold} < g \leq g_{dither}$) and are thus illuminated for a minimum illumination time (per colour) of the first DMD, an analogous requirement results for $I_{theor}(g) = I_{2xDMD}(g_1=0, g^*_2)$, namely $$I_{theor}(g) = I_{2xDMD}(g_1=1, g^*_2)$$

Here the grey-scale value $g_1 = 1$ of the first modulator 3 is intended to provide the illumination time $\tau$. The following results:

$$T_1 = 3 \cdot T_{RGB} - 3 \cdot \tau$$

$$T_2 = 3 \cdot \tau - 3 \cdot n_2 \cdot t_{min}$$

$$T_3 = 3 \cdot n_2 \cdot t_{min}$$

It follows from this:

$$\left(\frac{g}{255}\right)^\gamma =$$

$$\frac{1}{T}\{T_1 \cdot U^2 + T_2 \cdot U + T_3\} = \frac{(T_{RGB} - \tau) \cdot U^2 + (\tau - n_2 \cdot t_{min}) \cdot U + n_2 \cdot \tau_{min}}{T_{RGB}}$$

The following thus results:

$$n_2(g_{threshold} < g \leq g_{dither}) = \left\lceil \frac{T_{RGB} \cdot \left(\frac{g}{255}\right)^\gamma - (T_{RGB} - \tau) \cdot U^2 - \tau \cdot U}{t_{min} \cdot (1-U)} \right\rceil$$

The resulting input grey-scale values for the second modulator 5 arise in exactly the same way as above:

$$g''_2(g_{threshold} < g \leq g_{dither}) = \left\lceil 255 \cdot \left(\frac{n_2(g) \cdot t_{min}}{T_{RGB}}\right)^{1/\gamma} \right\rceil$$

For grey shades $g > g_{dither}$, the procedure already described is followed for a dual modulation in which the required time slices are made available by a first of the two modulators 3, 5, which required time slices are required for the modulation by means of the second modulator 3, 5 in order to generate the sought grey shade.

If these are combined, the following results:

$$I_{boost\,3}(g) = \begin{cases} U^2 & \text{for } g = 0 \to (g_1 = g''_2 = 0) \\ \dfrac{n_2 \cdot t_{min} \cdot U + (1-U)}{T_{RGB}} + U^2 & \text{for } 0 < g \leq g_{threshold} \to \left(g_1 = 0, n_2 = \left\lceil \dfrac{T_{RGB} \cdot \left(\left(\frac{g}{255}\right)^\gamma - U^2\right)}{t_{min} \cdot U \cdot (1-U)} \right\rceil\right) \\ \dfrac{(T_{RGB} - \tau) \cdot U^2 - (\tau - n_2 \cdot t_{min}) \cdot U + n_2 \cdot t_{min}}{T_{RGB}} & \text{for } g_{threshold} < g \leq g_{dither} \to \\ & \left(g_1 = \bot, n_2 = \left\lceil \dfrac{T_{RGB} \cdot \left(\frac{g}{255}\right)^\gamma - (T_{RGB} - \tau) \cdot U^2 - \tau \cdot U}{t_{min} \cdot (1-U)} \right\rceil\right) \\ \text{Normal } DMD \text{ dual modulaton for } g_{dither} < g \leq 255 \end{cases}$$

In Table 5 below, the results according to this calculation method are summarized. It is evident that with this method the boosted values can be represented more accurately.

TABLE 5

| $g_1$ [0:255] | $g_2^*$ [0:255] | $n_2$ | $T_1$ [µs] | $T_2$ [µs] | $T_3$ [µs] | [0:1] | [%] |
|---|---|---|---|---|---|---|---|
| 0 | 0 | 0 | 0 | 0 | 0 | 1.00E−06 | |
| 0 | 21 | 87 | 12449 | 51 | 0 | 5.07E−06 | 0.059% |
| 0 | 45 | 477 | 12221 | 279 | 0 | 2.33E−05 | 0.039% |
| 0 | 69 | 1194 | 11800 | 700 | 0 | 5.69E−05 | 0.016% |
| 0 | 92 | 2268 | 11171 | 1329 | 0 | 1.07E−04 | 0.018% |
| 0 | 115 | 3718 | 10321 | 2179 | 0 | 1.75E−04 | 0.010% |
| 0 | 138 | 5564 | 9240 | 3260 | 0 | 2.62E−04 | 0.003% |
| 0 | 162 | 7819 | 7919 | 4581 | 0 | 3.67E−04 | 0.003% |
| 0 | 185 | 10496 | 6350 | 6150 | 0 | 4.93E−04 | 0.001% |
| 0 | 208 | 13607 | 4527 | 7973 | 0 | 6.38E−04 | 0.001% |
| 0 | 231 | 17162 | 2444 | 10056 | 0 | 8.05E−04 | 0.001% |
| 0 | 254 | 21170 | 96 | 12404 | 0 | 9.92E−04 | 0.002% |
| 1 | 12 | 24 | 11600 | 885.9 | 14.1 | 1.20E−03 | 0.411% |
| 1 | 13 | 29 | 11600 | 883.0 | 17.0 | 1.43E−03 | 0.153% |
| 1 | 14 | 34 | 11600 | 880.1 | 20.0 | 1.67E−03 | 1.294% |
| 1 | 15 | 40 | 11600 | 876.6 | 23.4 | 1.95E−03 | 0.884% |
| 1 | 16 | 47 | 11600 | 872.5 | 27.5 | 2.27E−03 | 0.482% |
| 1 | 17 | 54 | 11600 | 868.5 | 31.6 | 2.60E−03 | 0.612% |
| 1 | 18 | 61 | 11600 | 864.3 | 35.7 | 2.93E−03 | 0.098% |
| 1 | 19 | 69 | 11600 | 859.6 | 40.4 | 3.30E−03 | 0.041% |
| 1 | 20 | 77 | 11600 | 854.9 | 45.1 | 3.68E−03 | 0.502% |
| 1 | 21 | 86 | 11600 | 849.6 | 50.4 | 4.10E−03 | 0.389% |
| 1 | 22 | 96 | 11600 | 843.8 | 56.3 | 4.57E−03 | 0.190% |
| 1 | 23 | 106 | 11600 | 837.9 | 62.1 | 5.04E−03 | 0.169% |
| 1 | 24 | 116 | 11600 | 832.0 | 68.0 | 5.50E−03 | 0.303% |
| 1 | 25 | 127 | 11600 | 825.6 | 74.4 | 6.02E−03 | 0.339% |
| 1 | 26 | 139 | 11600 | 818.6 | 81.4 | 6.58E−03 | 0.044% |
| 1 | 27 | 151 | 11600 | 811.5 | 88.5 | 7.14E−03 | 0.155% |
| 1 | 28 | 164 | 11600 | 803.9 | 96.1 | 7.75E−03 | 0.022% |
| 1 | 29 | 177 | 11600 | 796.3 | 103.7 | 8.36E−03 | 0.139% |
| 1 | 30 | 191 | 11600 | 788.1 | 111.9 | 9.02E−03 | 0.049% |

In the earlier observations, it was assumed that the imaging optical system 4 images each tilting mirror K1 onto precisely one assigned tilting mirror K2 (and only onto the latter). This is however practically impossible to achieve in the case of an actual system, with the result that a tilting mirror K2 receives light from the directly assigned tilting mirror K1 (which can also be referred to as the main illuminating pixel since the majority of the light incident on the tilting mirror comes from it) as well as light from tilting mirrors K1 adjacent thereto.

Figure 11:
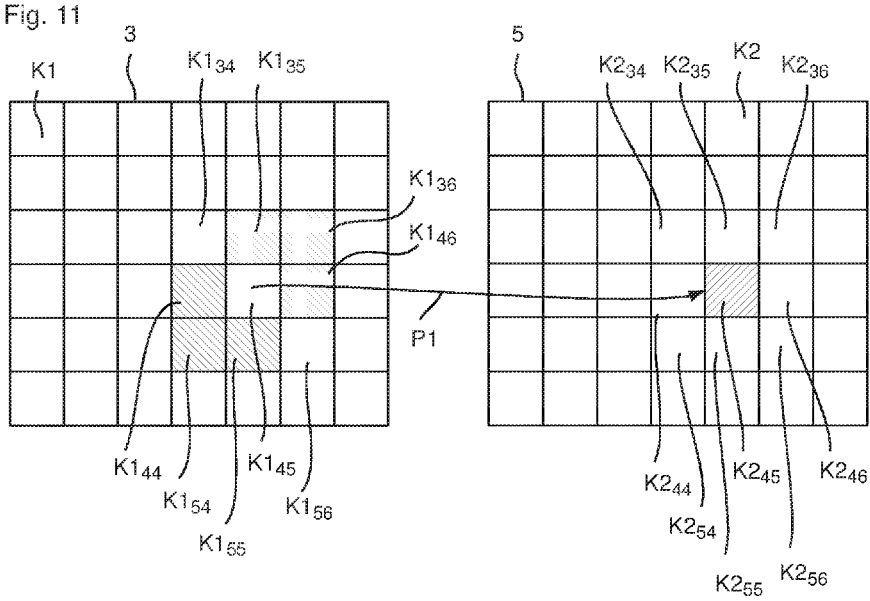
FIG. 11 is a representation to illustrate the assignment of multiple first pixels of the first modulator 3 to a second pixel of the second modulator.

This is represented schematically in FIG. 11. The tilting mirror $K2_{45}$ of the image modulator 5, represented by hatching, may be observed. This is illuminated primarily by means of the light from the directly assigned tilting mirror $K1_{45}$ (=main illuminating pixel) of the illumination modulator 3, as indicated by the arrow P1. However light from the tilting mirrors $K1_{34}$, $K1_{35}$, $K1_{36}$, $K1_{44}$, $K1_{46}$, $K1_{54}$, $K1_{55}$, $K1_{56}$ directly adjacent to the tilting mirror $K1_{45}$ is also incident on the tilting mirror $K2_{45}$ of the image modulator 5. In this case, the tilting mirrors $K1_{45}$, $K1_{34}$, $K1_{35}$, $K1_{36}$, $K1_{44}$, $K1_{46}$, $K1_{54}$, $K1_{55}$, $K1_{56}$ of the illumination modulator 3 are thus assigned to the tilting mirror $K2_{45}$ of the image modulator 5.

This assignment can also be conceived starting from a tilting mirror K1 of the illumination modulator 3. In this way light from the tilting mirror $K1_{45}$ is primarily incident on the tilting mirror $K2_{45}$. In addition, light from the tilting mirror $K1_{45}$ is incident on the adjacent tilting mirrors $K2_{34}$, $K2_{35}$, $K2_{36}$, $K2_{44}$, $K2_{46}$, $K2_{54}$, $K2_{55}$ and $K2_{56}$, with the result that the tilting mirror $K1_{45}$ is assigned to nine tilting mirrors $K2_{34}$, $K2_{35}$, $K2_{36}$, $K2_{44}$, $K2_{54}$, $K2_{46}$, $K2_{54}$, $K2_{55}$ and $K2_{56}$.

If the tilting mirror $K2_{45}$ is intended to represent a grey-scale value which is less than or equal to the threshold value $g_{threshold}$ and the adjacent tilting mirror $K2_{44}$ is intended to represent a grey-scale value which is above the threshold value, this would lead to a situation where the illuminating pixel $K1_{45}$ is switched to black in order to boost the image pixel $K2_{45}$ and the illuminating pixel $K1_{44}$ is switched to white for the tilting mirror $K2_{44}$. The illuminating pixel $K2_{45}$ to be boosted would thus receive more light than desired (e.g. owing to the light coming from the illuminating pixel $K1_{44}$), which would result in a boosted pixel which is too bright.

Figures 12, 13:
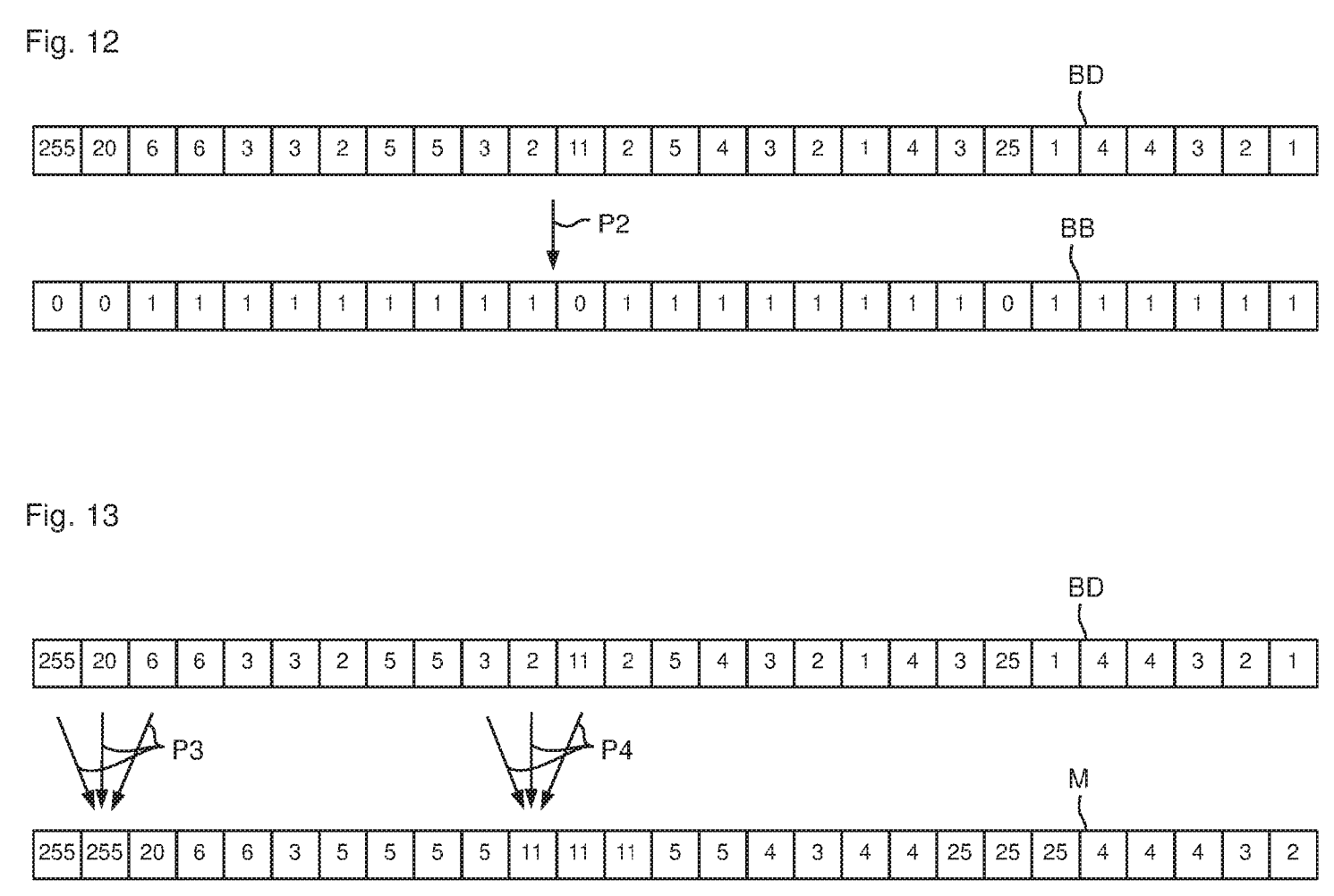

For the description that follows, a row of pixels containing 27 pixels to be represented is assumed for simplification of the representation, as shown in FIG. 12. Each square represented stands for one pixel, wherein in each pixel the grey-scale value to be represented is indicated as a number (=image data BD). The grey-scale value 10 is specified as threshold value $g_{threshold}$. On the basis of the given image data BD, it can be determined for each pixel (arrow P2) whether it can be boosted (its grey-scale value is less than or equal to the threshold value 10) or not (its grey-scale value is greater than the threshold value 10). Boost data BB are thereby determined which are in turn represented for each pixel. If the value of the pixel is 1, a pixel which can be boosted is present. With a value of 0, the pixel cannot be boosted.

Furthermore, the pattern data M are generated on the basis of the given image data BD. For this, for each pixel, the maximum value is determined from the values of the image data for the pixel and its direct neighbouring pixels and this maximum value is written into the corresponding pixel of the pattern data M, as indicated by the arrows P3 and P4 in FIG. 13 for two pixels of the pattern data M. It is thereby ensured that each pixel of the image modulator 5 is illuminated equally or sufficiently, even if the illuminating pixels are at times switched off during a frame duration on the basis of the pulse-width modulated illumination control data MS.

Figure 14:
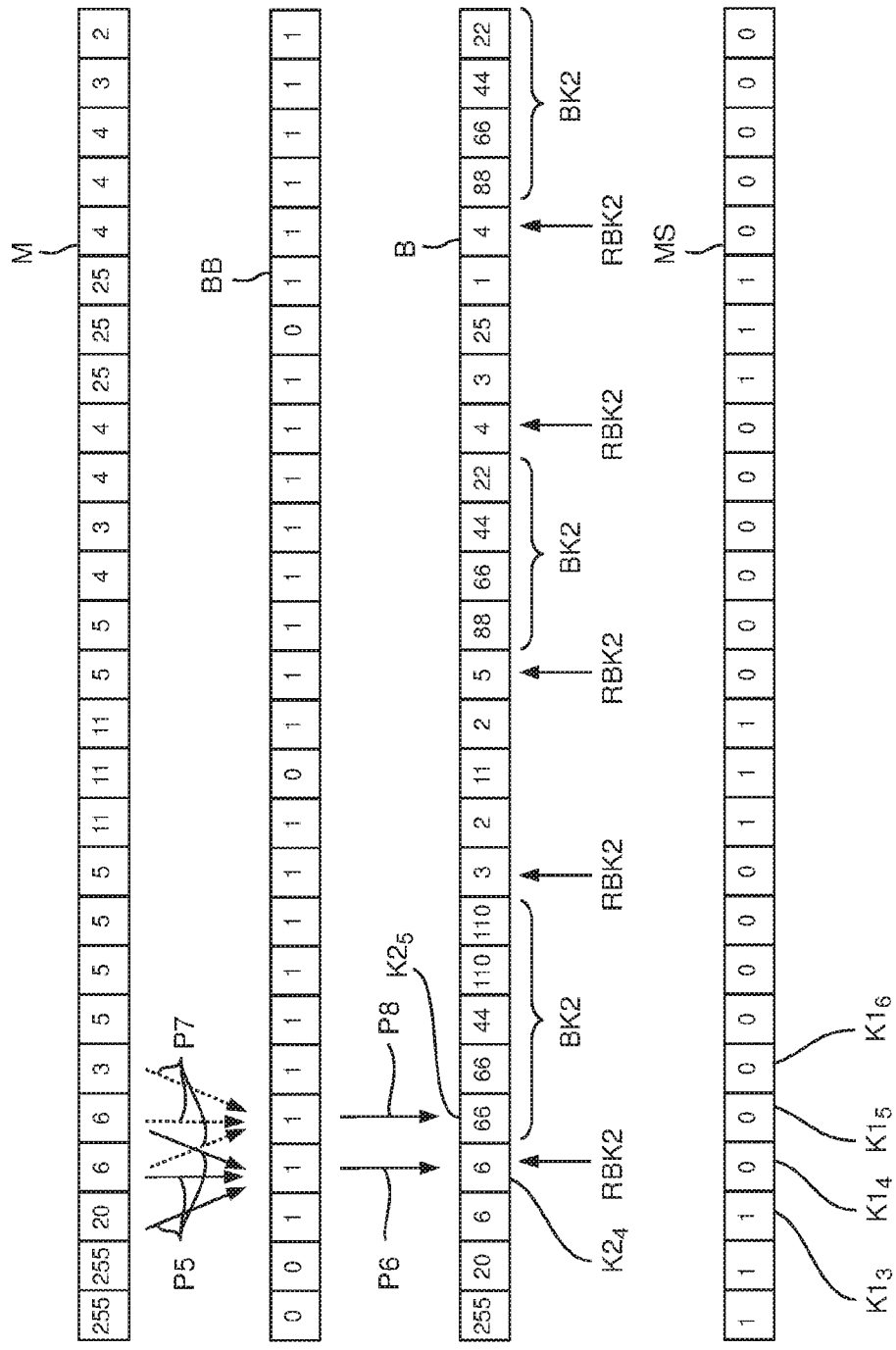
FIG. 14 is a schematic representation to illustrate the determination of the brightness values for boosted and non-boosted pixels as well as the corresponding illumination control data MS.

As shown in FIG. 14, it is determined for each pixel which can be boosted (pixel with the value 1 in the boost data BB) whether the illuminating pixel values of the respective assigned three pixels of the pattern data M all in each case have a value less than or equal to the threshold value. If this is not the case, the grey-scale value in the frame data B is not boosted and is thereby adopted unchanged. This is indicated by the arrows P5 and P6. The left-hand arrow of the three arrows P5 shows that the value 20 is assigned to the pixel which can be boosted in the pattern data M, with the result that the grey-scale value is not boosted.

In the case of the pixel which can be boosted, the assigned pixel values of the pattern data M of which are highlighted by the arrows P7, all pixel values are less than or equal to the threshold value, with the result that the corresponding grey-scale value in the frame data B is boosted from 6 to 66 (arrow P8). It is assumed here that the grey-scale value of a boosted pixel is determined starting from the original grey-scale value by multiplication by a boost factor (which is 22 here).

The illumination control data MS are generated on the basis of the pattern data M in the embodiment example described here such that, for values greater than the threshold value 10 according to the grey-scale value in the image data, they are set to on or white and, for values less than or equal to the threshold value 10, they are set to off or black. All boosted pixels BK2 are thus definitely only illuminated by means of the unavoidable background brightness which is modulated corresponding to the boosted values. In this way, for example, the pixel $K2_5$ is illuminated by light from the pixels $K1_4$, $K1_5$ and $K1_6$ which are all set to off (=0).

By contrast, all non-boosted pixels are illuminated.

However, in the case of some of the non-boosted pixels, the brightness of the illumination may turn out somewhat lower than previously. This applies to the edge pixels RBK2, the respective assigned main illuminating pixel of which is switched to black, since this main illuminating pixel is switched to black because of a boosted pixel. However, a neighbouring illuminating pixel is not switched to black, with the result that light from this neighbouring illuminating pixel is incident on the edge pixel RBK2 which can be boosted. Since the edge pixel RBK2 which can be boosted does not however have a boosted grey-scale value, but instead the original grey-scale value, an edge which is too bright can as a result definitely be avoided. This applies, for example, to the pixel $K2_4$ the main illuminating pixel $K1_4$ of which is indeed switched to off. However, a residual illumination is present by virtue of the illuminating pixel $K1_3$.

This avoidance of the edge which is too bright can however result in a situation where the edge appears too dark since the edge pixel RBK2 is illuminated by means of the residual illumination described.

This undesired effect can be lessened by utilizing the pulse-width modulation in order to actuate the illuminating and image pixels K1 and K2. Furthermore the number of boosted pixels can be increased, as described in detail below.

Taking the same image data BD as in FIG. 12 as a starting point, the boost data BB are generated therefrom, as has already been described in connection with FIG. 12.

Pattern data M are also generated on the basis of the image data BD in the same way as in FIG. 13. These are then evaluated for the illumination modulator 3 in a further step in view of the consequent pulse-width modulation.

Figure 15:
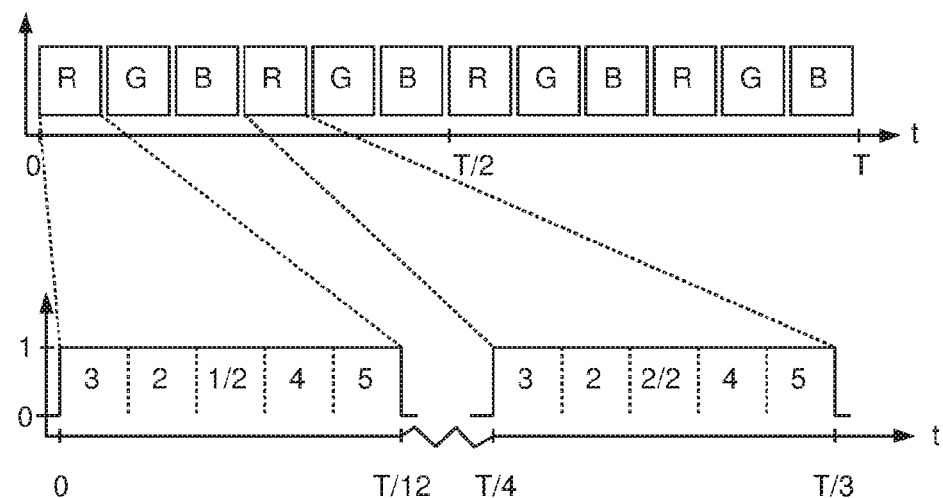
FIG. 15 is a representation to illustrate the pulse-width modulation for the illumination modulator.

The pulse-width modulation for the illumination modulator 3 has, for each of the three colours red, green and blue during the frame duration T, various periods which are explained in conjunction with FIG. 15. Due to the assumed rotational frequency of 120 Hz for the colour wheel 15, four colour passes occur for each of the three colours red, green and blue per frame duration T, as shown schematically in FIG. 15. The colour passes are denoted by R for red, G for green and B for blue. The colour red is discussed in detail below. The same applies however for the colours green and blue.

Since the individual periods (which can also be referred to as time slots) are uniformly distributed for the first and second complete rotations of the colour wheel 15 during a frame duration T, only the first rotation of the colour wheel 15 is described in detail.

In the bottom part of FIG. 15, the first and second colour passes are therefore illustrated for red by means of an extended time scale. It is clear from this that each colour pass is divided into five periods of equal length which are denoted by ½, 2, 3, 4 and 5 or 2/2, 2, 3, 4 and 5. There are consequently six different periods (½, 2/2, 2, 3, 4 and 5) in the course of one colour pass. For each period, it can be set by means of the illumination control data BS for each illuminating pixel individually whether it is switched on (=1 and corresponds to the illumination of the assigned image pixels) or whether it is switched off (=0 and corresponds to no active illumination of the assigned image pixels).

It is furthermore assumed that the illumination control data MS can have the values 0, ½, L or H.

Here 0 means that the corresponding illuminating pixel is switched off for the entire frame duration T. The value ½ means that only the period ½ is used for the illumination, wherein grey-scale values from 1 to 12 can consequently be represented. The value L means that only the periods 2/2, 2, 3, 4 and 5 are used for the illumination, wherein grey-scale values from 13 to 229 can consequently be represented. The value H means that all the periods ½, 2/2, 2, 3, 4 and 5 are used for the illumination, wherein grey-scale values greater than or equal to 230 can consequently be represented.

Figure 16:
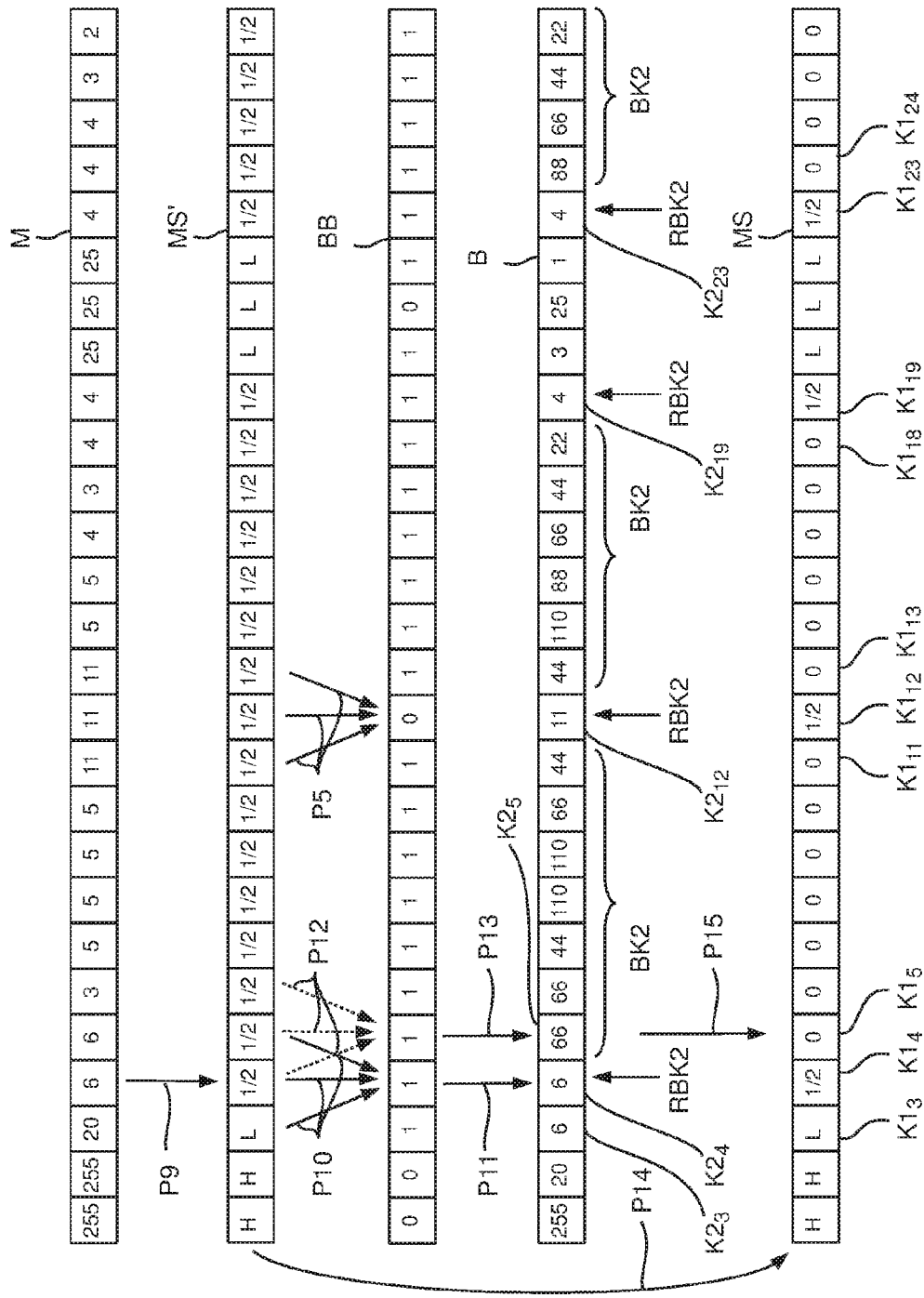
FIG. 16 is a representation for determination of the brightness values for the boosted pixels and non-boosted pixels as well as of the corresponding illumination control data.

As now shown in FIG. 16, provisional illumination control data MS' are generated from the pattern data M, wherein the described possible values of the illumination control data MS are allocated to the individual pixels (arrow P9).

It is then determined for each pixel which can be boosted (pixel with the value 1 in the boost data BB) whether the values of the provisional illumination control data MS' of the respective assigned three pixels do not have any values other than 0 and ½. If this is not the case, the grey-scale value in the frame data B is not boosted and is thereby adopted unchanged. This is indicated by the arrows P10 and P11, wherein the left-hand arrow of the arrows P10 shows that the value L is assigned to the pixel which can be boosted in the provisional illumination control data MS', with the result that the grey-scale value is not boosted.

In the case of the pixel which can be boosted, the assigned pixel values of the provisional illumination control data MS' of which are highlighted by the arrows P12, all pixel values are from the group which includes the values 0 and ½. The corresponding grey-scale value of 3 according to the image data BD is therefore increased to 66 (as a result of the boost factor 22).

The illumination control data MS are then generated on the basis of the provisional illumination control data MS' and the image data B such that, for boosted pixels, the assigned main illuminating pixel is set to 0 and the remaining illuminating pixels have the same value as in the provisional illumination control data MS', as indicated by the arrows P14 and P15.

As shown by a comparison of the image data B according to FIG. 16 with the image data B according to FIG. 14, it is possible to boost more pixels which can be boosted. Furthermore, for example, the left-hand edge pixel $K2_4$ can be illuminated normally via its assigned main illuminating pixel $K1_4$ (illumination control data value ½) since the directly adjacent boosted image pixel $K2_5$ with the boosted grey-scale value of 66 is switched into its on-state only at those times which do not coincide with the time slot ½. This is shown schematically for the tilting mirrors $K1_4$, $K1_5$, $K2_4$ and $K2_5$ in the four representations FIGS. 17a, 17b, 17c and 17d for the colour red in the same way as in the lower part of the representation of FIG. 15.

Figure 17A:
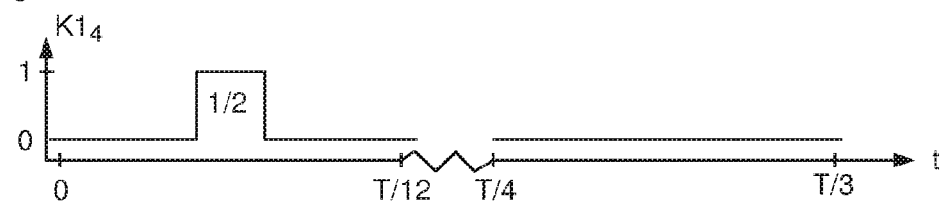
FIGS. 17a-17d are representations to illustrate the utilization of periods in which the illuminating pixels are switched off in order to be able to boost more image pixels.
Figure 17B:
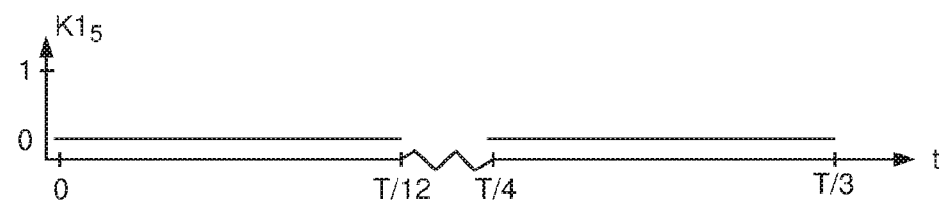
Figure 17C:
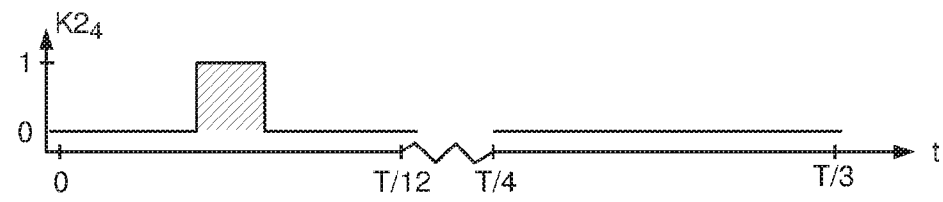
Figure 17D:
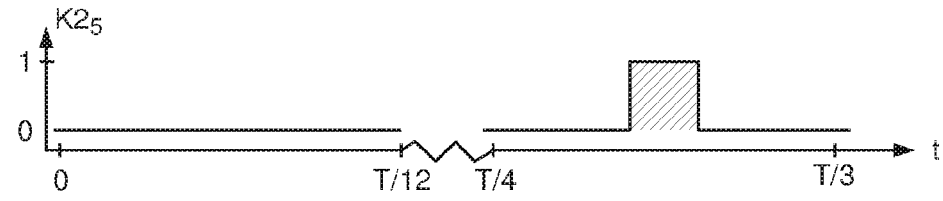

FIGS. 17a and 17b show the times at which the tilting mirrors $K1_4$ and $K1_5$ are switched on (=1) and switched off (=0) for the illumination. The tilting mirror $K1_4$ is switched on during the time slot ½ and switched off during the remaining time slots. The tilting mirror $K1_5$ is permanently switched off.

The tilting mirror $K2_4$ (=image pixel $K2_4$) is switched on during the time slot ½ in order to modulate the grey-scale value 6. This is indicated by hatching, since the tilting mirror $K2_4$ does not need to be in the on-state (=1) during the entire time slot ½. The tilting mirror $K2_4$ is permanently in the off-state (=0) during the other time slots 2/2, 2, 3, 4 and 5.

The tilting mirror $K2_5$ (=image pixel $K2_5$) is switched on during the time slot 2/2 in order to modulate the grey-scale value 66. This is indicated by hatching, since the tilting mirror $K2_5$ does not need to be in the on-state (=1) during the entire time slot 2/2. The tilting mirror $K2_5$ is permanently in the off-state (=0) during the other time slots ½, 2, 3, 4 and 5.

As can be learned from these representations in FIGS. 17a-17d, the unavoidable scattered illumination light from the tilting mirror $K1_4$ (or transferred residual illumination light, although the tilting mirror $K1_4$ is in the off-state), which is incident on the tilting mirror $K2_5$ during the time slot ½, does not influence the modulation of the tilting mirror $K2_5$ for the boosted grey-scale value 66 since the scattered light is only incident on the tilting mirror $K2_5$ for a period in which the tilting mirror $K2_5$ is set to off and is not switched into the on-state for the modulation. There is thus a temporal separation of the illumination at the edge of the boosted range, whereby it is possible to boost more pixels which can be boosted and the brightness of the edge pixel K2 is better matched to the brightness of the adjacent unboosted pixels (e.g. pixels $K2_3$) (see FIG. 16) compared with the embodiment according to FIGS. 12-14.

In the variant according to FIG. 16, the edge pixels RBK2 are illuminated at least by means of the assigned main illuminating pixels $K1_4$, $K1_{12}$, $K1_{19}$ and $K1_{23}$. However, the illumination (pixels $K1_5$, $K1_{11}$, $K1_{13}$, $K1_{18}$ as well as $K1_{24}$) is set to zero for the directly adjacent boosted pixels $K2_5$, $K2_{11}$, $K2_{13}$, $K2_{18}$ and $K2_{24}$, which leads to an illumination of the edge pixels RBK2 ($K2_4$, $K2_{12}$, $K2_{19}$ and $K2_{23}$) which is not optimal.

Figure 18:
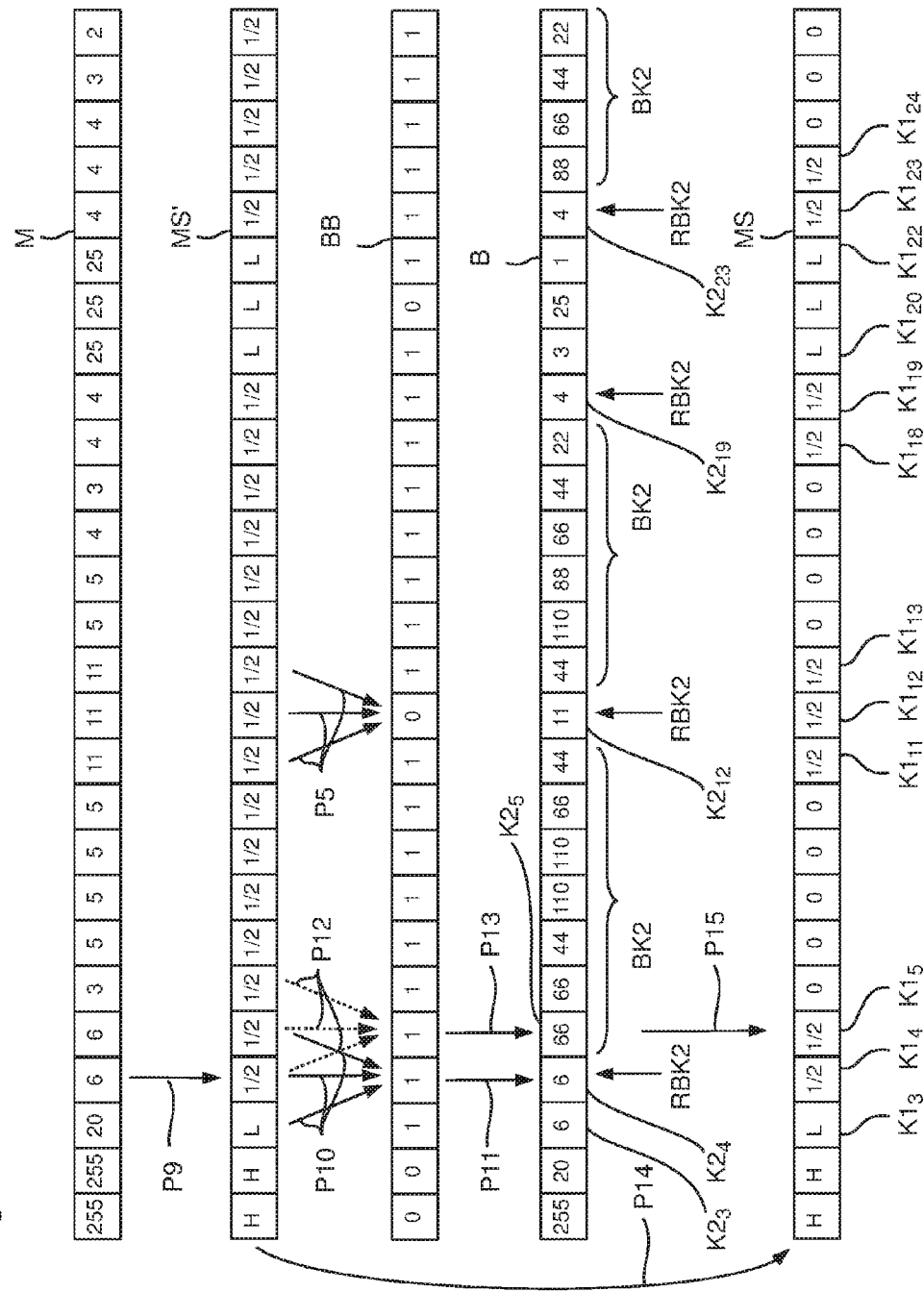
FIG. 18 is a representation according to FIG. 16 to illustrate a further development of the projector according to the invention.

Since in the embodiment described here the threshold value is 10 and the boost factor is 22, the maximum brightness value of a boosted pixel is 220. This brightness value can be represented with the periods 2/2, 2, 3, 4 and 5 for the illumination modulator 3 such that the period ½ is not required. This means, however, that the period ½ can also be set for main illuminating pixels of boosted image pixels. This is utilized in a development of the embodiment described in conjunction with FIG. 16 in such a way that all three assigned illuminating pixels of each edge pixel RBK2 are set at least to ½. This is shown in FIG. 18, which essentially corresponds to FIG. 16. Reference is therefore made to the above remarks for the description of FIG. 18. In contrast to the embodiment of FIG. 16, however, the illuminating pixels $K1_5$, $K1_{11}$, $K1_{13}$, $K1_{18}$ as well as $K1_{24}$ are set to ½, with the result that the corresponding edge image pixels $K2_4$, $K2_{12}$, $K2_{19}$ and $K2_{23}$ are in each case illuminated by all three assigned illuminating pixels and sufficient illumination can thus be ensured. The matching of the brightness of the illuminated edge pixels RBK2 to the brightness of the adjacent non-boosted pixels is consequently again improved in comparison with the embodiment according to FIG. 16.

As has already been described, the threshold value and the boost factor are selected such that the maximum brightness value of a boosted pixel is 220, and consequently all boost values can be represented without the period ½. It is however also possible to specify the threshold value and/or the boost factor such that, for boosted pixels, brightness values are present which are greater than 220 and for which the period ½ would thus be required. In this case, for example boost values of greater than 220 can only be represented with the brightness value 220. The difference in the case of high brightness is imperceptible for a viewer. Furthermore or alternatively, it is possible also to represent boost values of greater than 220 using the period ½ if all the assigned first pixels are switched into the second state for the entire frame duration. This applies in particular for boosted pixels, the neighbours and possibly further neighbours of which are also all boosted pixels.

In the description so far, only the direct neighbouring pixels of the main illuminating pixel of the first modulator 3 have been taken into account, with the result that in the representations according to FIGS. 12-14, 16, 17a-17d and 18 three first pixels ($K1_3$, $K1_4$ and $K1_5$) are always observed for one second pixel ($K2_4$) in the representation in rows, which according to FIG. 11, taking the two-dimensional design of the modulators 3, 5 into account, corresponds to nine first pixels of the image modulator 5 ($K1_{34}$, $K1_{35}$, $K1_{36}$, $K1_{44}$, $K1_{45}$, $K1_{46}$, $K1_{54}$, $K1_{55}$, $K1_{56}$) for one second pixel ($K2_{45}$). Of course, further neighbouring pixels can also be taken into account such that, for example, the two nearest neighbours are taken into account. In the representation in rows according to FIGS. 12-14, 16, 17a-17d and 18, this corresponds to five first pixels and, taking the two-dimensional design of the modulators 3, 5 according to FIG. 11 into account, there are then 25 first pixels.

Figure 19:
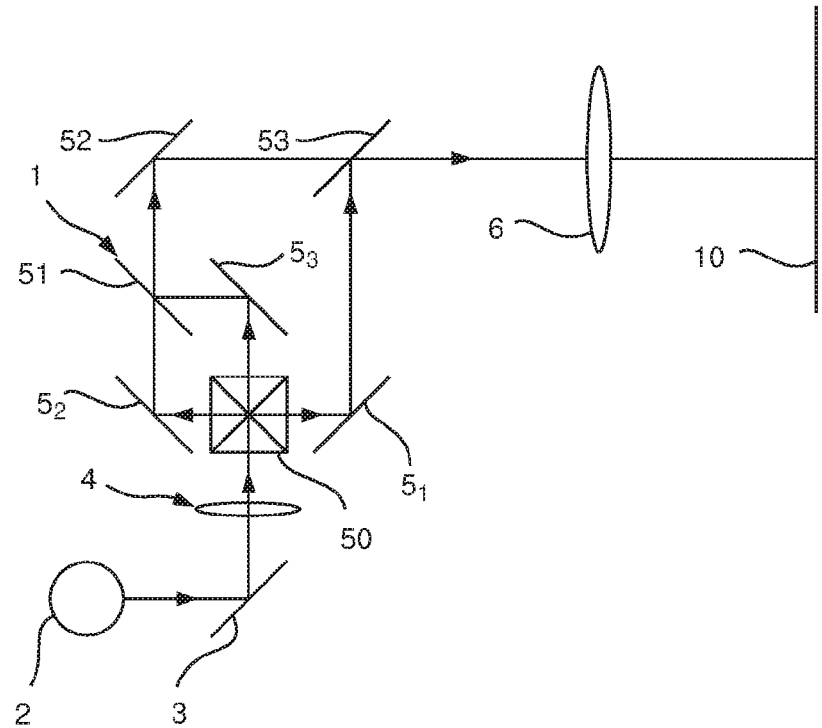
FIG. 19 is a schematic representation of a further embodiment of the projector according to the invention.

A modification of a projector according to the invention shown in FIG. 1 is shown in FIG. 19 wherein the same elements are labeled with the same reference signs. The control unit 7 is not shown for simplicity of representation. Three image modulators $5_1$, $5_2$ and $5_3$ and a color splitting cube 50 are provided in the projector of FIG. 19 in contrast to the projector according to FIG. 1. The image modulator $5_1$ can be struck with red light, the image modulator $5_2$ can be struck with green light and the image modulator $5_3$ can be struck with blue light. The modulation of the image modulators $5_1$, $5_2$ and $5_3$ and of the illumination modulator 3 is carried out in the same way as in connection with the projector 1 according to FIG. 1. The light modulated by the image modulators $5_1$, $5_2$ and $5_3$ is superimposed to a common ray bundle for projection by means of two color splitters 51 and 53 and a deflecting mirror 52, which common ray bundle is imaged by means of the projection optical system 6 onto the projecting surface 10.

The light source 2 can emit white light, for example, which is modulated by means of the illumination modulator 3 and which then is divided depending on the wavelengths by means of the color splitting cube 15 such that the image modulator $5_1$ is illuminated with red light, the image modulator $5_2$ is illuminated with green light and the image modulator $5_3$ is illuminated with blue light as described. The illumination of the image modulators $5_1$-$5_3$ can be carried out in a time-sequential manner or simultaneously.

The assignment of the pixels of the illumination modulator 3 to each of the image modulators $5_1$, $5_2$, $5_3$ can be present in the same manner as in the already described embodiments of the projector 1 according to the invention.

Figure 20:
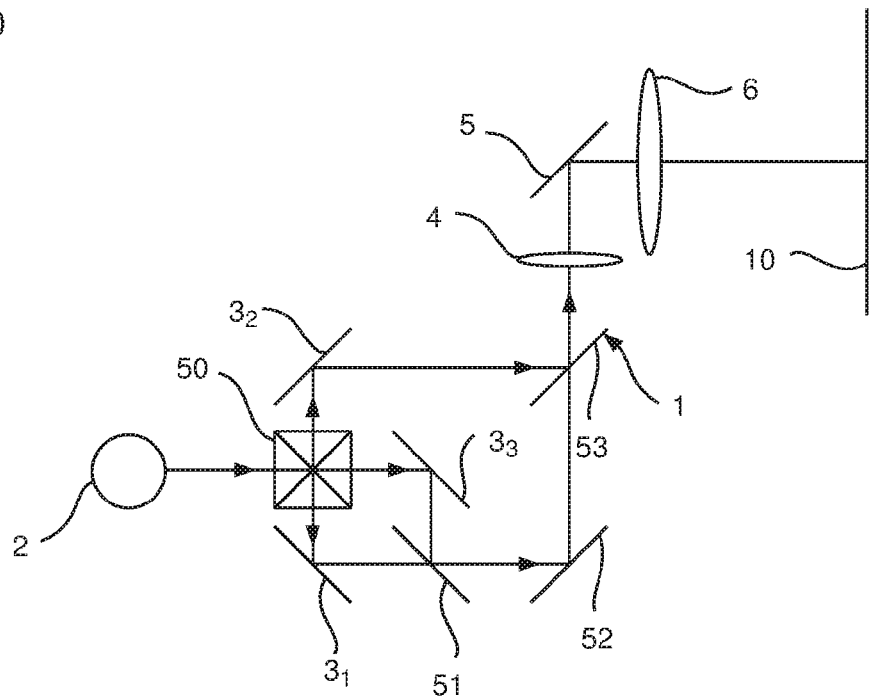
FIG. 20 is a schematic representation of a further embodiment of the projector according to the invention.

A modification of the projector 1 according to the invention is shown in FIG. 20 in the same manner as in FIG. 19. Three illuminating modulators $3_1$, $3_2$ and $3_3$ are provided in the projector according to FIG. 20 in contrast to the projector of FIG. 19, which illumination modulators $3_1$-$3_3$ are provided for red illumination light (illumination modulator $3_1$), green illumination light (illumination modulator $3_2$) and blue illumination light (illumination modulator $3_3$), for example, and each illumination modulator $3_1$-$3_3$ modulates the corresponding color. The application of the illumination modulators $3_1$-$3_3$ with red, green, and blue light can be carried out by means of the color splitting cube 50, which is applied with white light from the light source 2. The red, green and blue illumination light, which is modulated, is directed to the image modulator 5 by means of the color splitter 51 and 53 and the deflecting mirror 52. The modulated light, which is modulated by the image modulator 5, is imaged by means of the projection optical systems 6 onto the projecting surface 10.

The illumination modulators $3_1$-$3_3$ can be controlled such that the image modulator 5 is struck with modulated green, blue, and red illumination light in a time-sequential manner. As an alternative the modulated green, blue and red illumination light can be simultaneously directed on the image modulator 5.

The assignment of the pixels of each illumination modulator $3_1$-$3_3$ to the pixels of the image modulator 5 can be present in the same manner as in the already described embodiments of the projectors 1 according to the invention.

Thus, the projector according to the invention can be embodied such that N first modulators (wherein N is an integer greater than 1; in FIG. 19 N=3) are imaged onto one second modulator or such that one first modulator is imaged onto M second modulators (wherein M is an integer greater than 1; in FIG. 20 M=3). Further, the projector 1 according to the invention can be embodied such that N1 first modulators are imaged onto M1 second modulators, wherein N1 and M1 are each integers equal to or greater than 1 (N1 and M1 can be the same or different).

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

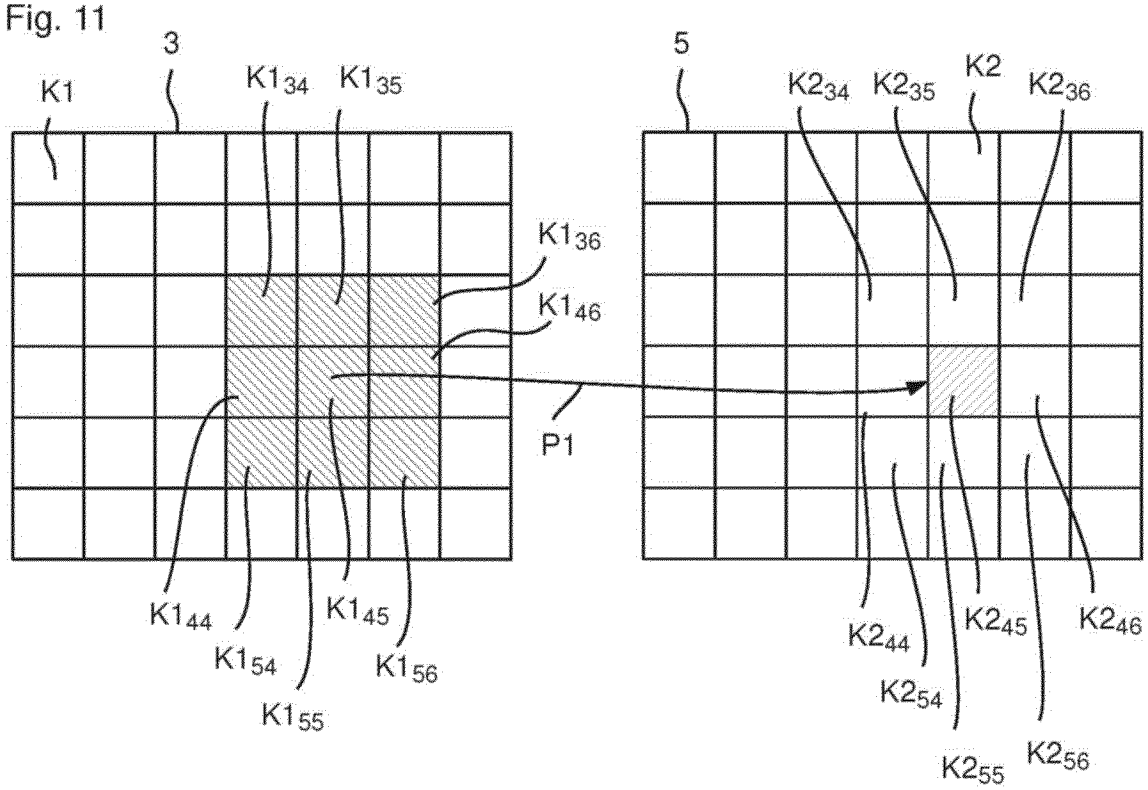

What is claimed is:

1. A projector for projecting images, comprising:
   a first modulator which can be struck with light from a light source, the first modulator comprising multiple first pixels arranged in rows and columns;
   a second modulator which is arranged downstream of the first modulator, the second modulator comprising multiple second pixels arranged in rows and columns;
   an imaging optical system which is configured to image the first modulator onto the second modulator,
   wherein the first and second pixels can be switched independently of each other in each case into a first state, in which light incident on them is used to generate an image, and into a second state, in which light incident on them is not used to generate an image, in order to modulate the light for generating the images pixel-by-pixel,
   a projection optical system which is configured to image light coming from the second modulator onto a projection surface in order to project the images; and
   a control unit, which is configured to control the two modulators on the basis of supplied image data,
   wherein at least one first pixel is assigned to each second pixel such that the imaging optical system is configured to:
      a) strike the second pixel with light from the respective assigned first pixel when the assigned first pixel is switched into the first state, in order to illuminate the second pixel actively, and
      b) not strike the second pixel with light from the respective assigned first pixel when the assigned first pixel is switched into the second state, in order not to illuminate the second pixel actively, with the result that only unavoidable residual light is incident on the second pixel,
   wherein the control unit is configured to control the modulators such that, for at least one second pixel which according to the image data is to represent a brightness value which is greater than zero and less than or equal to a predetermined first threshold value, the assigned first pixel(s) is or are switched into the second state at least for the periods in which the second pixel is switched into the first state such that no active illumination takes place and the second pixel modulates the residual light.

2. The projector according to claim 1, wherein the control unit is configured to actuate the second pixel modulating the residual light on the basis of an increased brightness value which is greater than the brightness value according to the image data.

3. The projector according to claim 2, wherein the increased brightness value corresponds to at least ten times the brightness value according to the image data with an assumed subdivision of the range from minimum to maximum brightness into 256 increments.

4. The projector according to claim 1, wherein the control unit is configured to control the two modulators by means of pulse-width modulated control data.

5. The projector according to claim 1, wherein the control unit is configured to determine the at least one second pixel, which modulates the residual light, via at least the following steps:
   a) at least one second pixel is selected, the brightness value of which, prespecified by the image data, is greater than zero and less than or equal to the first threshold value, and
   b) a selected second pixel is determined to be a second pixel modulating the residual light when all the assigned first pixels are actuated on the basis of the image data in each case according to a brightness value which is less than a predetermined second threshold value,
   wherein the second threshold value is selected such that the period(s) for which the first pixels are to be switched into the first state do(es) not overlap with the period(s) for which the second pixel modulating the residual light is to be switched into the first state, in order to modulate the residual light.

6. The projector according to claim 5, wherein the control unit is configured to only carry out step b) for a second pixel selected in step a) when at least one of k neighbouring pixels of the selected second pixel has a brightness value, prespecified by the image data, which is greater than the first threshold value, wherein k is a natural number greater than or equal to 1.

7. The projector according to claim 1, wherein precisely one first pixel is assigned to each second pixel.

8. The projector according to claim 1, wherein a first pixel, as well as at least one further first pixel which is directly adjacent to this first pixel, are assigned to each second pixel.

9. The projector according to claim 1, wherein the control unit is configured, for second pixels which according to the image data are to represent a brightness value which is greater than the first threshold value, to take into account the residual brightness in such a way that the second pixel is actuated on the basis of a reduced brightness value which is lower than the brightness value according to the image data.

10. A projector for projecting images, comprising:
    a first modulator which can be struck with light from a light source and a second modulator which is arranged downstream of the first modulator;
    an imaging optical system which is configured to image the first modulator onto the second modulator;

wherein the first modulator comprises multiple first pixels arranged in rows and columns and the second modulator comprises multiple second pixels arranged in rows and columns, wherein the first and second pixels can be switched independently of each other in each case into a first state, in which light incident on them is used to generate an image, and into a second state, in which light incident on them is not used to generate an image, in order to modulate the light for generating the images pixel-by-pixel, wherein the projector furthermore comprises a projection optical system which projects light coming from the second modulator onto a projection surface in order to project the images; and a control unit, which is configured to control the two modulators on the basis of supplied image data, wherein at least one first pixel is assigned to each second pixel such that the imaging optical system is configured to:

a) strike the second pixel with light from the respective assigned first pixel when the assigned first pixel is switched into the first state, in order to illuminate the second pixel actively, and b) not strike the second pixel with light from the respective assigned first pixel when the assigned first pixel is switched into the second state, in order not to illuminate the second pixel actively, with the result that only unavoidable residual light is incident on the second pixel, wherein the control unit is configured to control the modulators such that, for at least one second pixel which according to the image data is to represent a brightness value which is greater than zero and less than or equal to a predetermined first threshold value, the at least one second pixel is switched into the second state and for brightness modulation the assigned first pixel(s) is or are switched into the first state only during the period(s) in which the second pixel is switched into the second state, with the result that modulated residual light then emanates from the at least one second pixel, which contributes to the generation of an image.

11. The projector according to claim 10, wherein in order to generate the modulated residual light, the control unit is configured to actuate the assigned first pixel(s) on the basis of an increased brightness value which is greater than the brightness value according to the image data.

* * * * *

UNITED STATES PATENT AND TRADEMARK OFFICE
CERTIFICATE OF CORRECTION

PATENT NO. : 9,773,444 B2  
APPLICATION NO. : 15/405466  
DATED : September 26, 2017  
INVENTOR(S) : Bryce Anton Moffat et al.

Page 1 of 5

It is certified that error appears in the above-identified patent and that said Letters Patent is hereby corrected as shown below:

On the Title Page

Item (72), Line 1, Inventor Bryce Anton Moffat address: Delete "Jena-Cospeda, DE" and replace with --Jena, DE--.

In the Drawings

Figure 11 - Replace Figure 11 with the REPLACEMENT SHEET attached hereto.

In the Specification

Column 12, Line 4: Delete """ and replace with --°--.

Column 12, Line 15: Delete " $T_{RGB} := T_R = T_G = T_R = \frac{4 * 45°}{720°} * \frac{1}{60\text{Hz}} = 4167\mu s$ "

and replace with -- $T_{RGB} := T_R = T_G = T_B = \frac{4 * 45°}{720°} * \frac{1}{60\text{Hz}} = 4167\mu s$ --.

Column 15, Line 27: Insert --(≤-- after "shades".

Column 15, Line 67: Delete " $g_{threshold} - 255 \cdot (U)^{1/\gamma} - 11.03 \approx 11$ "

and replace with -- $g_{threshold} = 255 \cdot (U)^{1/\gamma} = 11.03 \approx 11$ --.

Column 16, Lines 6-8: Delete

" $I_{dual}(g_1, g_2) = i_{sota}(g_1) * I_{sota}(g_2) = \left\{U + (1-y) \cdot \left(\frac{g_1}{255}\right)^\gamma\right\} * \left\{U + (1-y) \cdot \left(\frac{g_2}{255}\right)^\gamma\right\}$ "

Signed and Sealed this  
Fourth Day of December, 2018

Andrei Iancu  
*Director of the United States Patent and Trademark Office* and replace with $$I_{dual}(g_1, g_2) = I_{sota}(g_1) * I_{sota}(g_2) = \left\{U + (1-U) \cdot \left(\frac{g_1}{255}\right)^\gamma\right\} * \left\{U + (1-U) \cdot \left(\frac{g_2}{255}\right)^\gamma\right\}$$

Column 16, Line 15: Delete

"$$I_{dual}(g_1 = 0, g_2) = U * \left\{U + (1-U) \cdot \left(\frac{g_1}{255}\right)^\gamma\right\}$$" and replace with $$I_{dual}(g_1 = 0, g_2) = U * \left\{U + (1-U) \cdot \left(\frac{g_2}{255}\right)^\gamma\right\}$$

Column 16, Line 24: Delete "$I_{dual} = (g_1 = 0, g_2) = I_{theor}(g)$" and replace with -- $I_{dual}(g_1 = 0, g_2) = I_{theor}(g)$ --.

Column 16, Line 33: Delete "[" and replace with --[[--.

Column 18, Lines 53-63: Delete $$I_{boost\,1}(g) = \begin{cases} U^2 & \text{for } g = 0 \to (g_1 = 0, g_2 = 0) \\ U \cdot \left\{U + (1-U) \cdot \left(\frac{g_1}{255}\right)^\gamma\right\} & \text{for } 0 < g \leq g_{threshold} \to \left(g_1 = 0, g_2 = 255 \cdot \left[\frac{\left(\frac{g}{255}\right)^\gamma}{1-U} - U\right]^{\frac{1}{\gamma}}\right) \\ U + (1-U) \cdot \left(\frac{g_2}{255}\right)^\gamma & \text{for } g > g_{threshold} \to (g_1 = 255, g_2 = g) \end{cases}$$

and replace with $$I_{boost\,1}(g) = \begin{cases} U^2 & \text{for } g = 0 \to (g_1 = 0, g_2 = 0) \\ U \cdot \left\{U + (1-U) \cdot \left(\frac{g_2}{255}\right)^\gamma\right\} & \text{for } 0 < g \leq g_{threshold} \to \left(g_1 = 0, g_2 = 255 \cdot \left[\frac{\left(\frac{g}{255}\right)^\gamma}{1-U} - U\right]^{\frac{1}{\gamma}}\right) \\ U + (1-U) \cdot \left(\frac{g_2}{255}\right)^\gamma & \text{for } g > g_{threshold} \to (g_1 = 255, g_2 = g) \end{cases}$$

Column 20, Line 40: Delete

"$I_{duel}(g_1 = 1, g_2') = I_{theor}(g)$ for all $g_{threshold} < g \leq 255$,"
and replace with -- $I_{dual}(g_1 = 1, g_2') = I_{theor}(g)$ for all $g_{threshold} < g \leq 255$ --.

Column 20, Line 50: Delete "255, as the operator indicates. For the case considered here" and replace with --255, as the operator [[...]] indicates. For the case considered here--.

CERTIFICATE OF CORRECTION (continued)
U.S. Pat. No. 9,773,444 B2

Column 22, Line 65: Delete

"$I_{2xDMD}(g_1, g_2'') = \dfrac{T_1(g_1, g_2'') \cdot U^2 + T_2(g_1, g_2'') \cdot U + T_3(g_1, g_2'')}{T}$"

and replace with

--$I_{2xDMD}(g_1, g_2^*) = \dfrac{T_1(g_1, g_2^*) \cdot U^2 + T_2(g_1, g_2^*) \cdot U + T_3(g_1, g_2^*)}{T}$--.

Column 23, Line 18: Delete "$I_{theor}(g) = I_{2xDMD}(g_1 = 0, g_1^*)$"

and replace with --$I_{theor}(g) = I_{2xDMD}(g_1 = 0, g_2^*)$--.

Column 23, Lines 45-47: Delete

"$g_2''(0 < g \leq g_{threshold}) = \left\| 255 \cdot \left( \dfrac{n_2(g) \cdot t_{min}}{T_{RGB}} \right)^{1/\gamma} \right\|$" and replace with --$g_2^*(0 < g \leq g_{threshold}) = \left\| 255 \cdot \left( \dfrac{n_2(g) \cdot t_{min}}{T_{RGB}} \right)^{1/\gamma} \right\|$--.

Column 23, Line 67: Delete "minimum illumination time (per colour) of the first DMD, an" and replace with --minimum illumination time τ (per colour) of the first DMD, an--.

Column 24, Line 10: Delete "$T_1 - 3 \cdot T_{RGB} - 3 \cdot \tau$"

and replace with --$T_1 = 3 \cdot T_{RGB} - 3 \cdot \tau$--.

Column 24, Lines 20-24: Delete

"$\left(\dfrac{g}{255}\right)^\gamma = \dfrac{1}{T}\{T_1 \cdot U^2 + T_2 \cdot U + T_3\} = \dfrac{(T_{RGB} - \tau) \cdot U^2 + (\tau - n_2 \cdot t_{min}) \cdot U + n_2 \cdot t_{min}}{T_{RGB}}$"

and replace with

--$\left(\dfrac{g}{255}\right)^\gamma = \dfrac{1}{T}\{T_1 \cdot U^2 + T_2 \cdot U + T_3\} = \dfrac{(T_{RGB} - \tau) \cdot U^2 + (\tau - n_2 \cdot t_{min}) \cdot U + n_2 \cdot t_{min}}{T_{RGB}}$--.

Column 24, Line 39: Delete "$g_2''(g_{threshold} < g \leq g_{dither}) = \left\| 255 \cdot \left( \dfrac{n_2(g) \cdot t_{min}}{T_{RGB}} \right)^{1/\gamma} \right\|$"

and replace with --$g_2^*(g_{threshold} < g \leq g_{dither}) = \left\| 255 \cdot \left( \dfrac{n_2(g) \cdot t_{min}}{T_{RGB}} \right)^{1/\gamma} \right\|$--.

Column 24, Lines 50-63: Delete

"$$I_{boost3}(g) = \begin{cases} U^2 & \text{for } g = 0 \rightarrow (g_1 = g_2^- = 0) \\ \dfrac{n_2 \cdot t_{min} \cdot U \cdot (1-U)}{T_{RGB}} + U^2 & \text{for } 0 < g \leq g_{threshold} \rightarrow \left(g_1 = 0, n_2 = \left\lceil \dfrac{T_{RGB} \cdot \left(\left(\frac{g}{255}\right)^\gamma - U^2\right)}{t_{min} \cdot U \cdot (1-U)} \right\rceil\right) \\ \dfrac{(T_{RGB} - \tau) \cdot U^2 + (\tau - n_2 \cdot t_{min}) \cdot U + n_2 \cdot t_{min}}{T_{RGB}} & \text{for } g_{threshold} < g \leq g_{dither} \rightarrow \left(g_1 = -, n_2 = \left\lceil \dfrac{T_{RGB} \cdot \left(\frac{g}{255}\right)^\gamma - (T_{RGB} - \tau) \cdot U^2 - \tau \cdot U}{t_{min} \cdot (1-U)} \right\rceil\right) \\ \text{Normal DMD dual modulation} & \text{for } g_{dither} < g \leq 255 \end{cases}$$"

and replace with $$I_{boost3}(g) = \begin{cases} U^2 & \text{for } g = 0 \rightarrow (g_1 = g_2^* = 0) \\ \dfrac{n_2 \cdot t_{min} \cdot U \cdot (1-U)}{T_{RGB}} + U^2 & \text{for } 0 < g \leq g_{threshold} \rightarrow \left(g_1 = 0, n_2 = \left\lceil \dfrac{T_{RGB} \cdot \left(\left(\frac{g}{255}\right)^\gamma - U^2\right)}{t_{min} \cdot U \cdot (1-U)} \right\rceil\right) \\ \dfrac{(T_{RGB} - \tau) \cdot U^2 + (\tau - n_2 \cdot t_{min}) \cdot U + n_2 \cdot t_{min}}{T_{RGB}} & \text{for } g_{threshold} < g \leq g_{dither} \rightarrow \left(g_1 = 1, n_2 = \left\lceil \dfrac{T_{RGB} \cdot \left(\frac{g}{255}\right)^\gamma - (T_{RGB} - \tau) \cdot U^2 - \tau \cdot U}{t_{min} \cdot (1-U)} \right\rceil\right) \\ \text{Normal DMD dual modulation} & \text{for } g_{dither} < g \leq 255 \end{cases}$$

Column 25, Line 62: Delete "$K2_{54}$" and replace with --$K2_{45}$--.